(12) United States Patent
Korem et al.

(10) Patent No.: US 12,436,897 B2
(45) Date of Patent: Oct. 7, 2025

(54) CACHE MANAGEMENT USING EVICTION PRIORITY BASED ON MEMORY REUSE

(71) Applicant: NVIDIA Corporation, Santa Clara, CA (US)

(72) Inventors: Noam Dor Korem, Tal-El (IL); Brian Scott Pharris, Cary, NC (US); Jacob Subag, Haifa (IL)

(73) Assignee: NVIDIA Corporation, Santa Clara, CA (US)

( * ) Notice: Subject to any disclaimer, the term of this patent is extended or adjusted under 35 U.S.C. 154(b) by 87 days.

(21) Appl. No.: 18/180,008

(22) Filed: Mar. 7, 2023

(65) Prior Publication Data

US 2024/0303203 A1    Sep. 12, 2024

(51) Int. Cl.
*G06F 12/12* (2016.01)
*G06F 12/126* (2016.01)
*G06N 3/0464* (2023.01)

(52) U.S. Cl.
CPC ......... *G06F 12/126* (2013.01); *G06N 3/0464* (2023.01)

(58) Field of Classification Search
CPC ........ G06F 12/12; G06F 12/126; G06F 12/00; G06N 3/0464
See application file for complete search history.

(56) References Cited

U.S. PATENT DOCUMENTS

| | | | |
|---|---|---|---|
| 10,019,368 B2 * | 7/2018 | Hagersten | G06F 12/0888 |
| 11,182,207 B2 | 11/2021 | Hirota et al. | |
| 2016/0062916 A1 * | 3/2016 | Das | G06F 12/1027 |
| | | | 711/133 |
| 2017/0357600 A1 * | 12/2017 | Moon | G06F 12/0895 |
| 2018/0349292 A1 * | 12/2018 | Tal | G06F 12/123 |
| 2019/0102302 A1 * | 4/2019 | Taht | G06F 12/0862 |
| 2022/0121985 A1 * | 4/2022 | Lloyd | G06F 3/0604 |
| 2022/0398038 A1 * | 12/2022 | Anchi | G06F 3/0611 |
| 2023/0102767 A1 * | 3/2023 | Emberling | G06T 15/80 |
| | | | 345/426 |
| 2023/0137205 A1 * | 5/2023 | Fu | G06N 3/044 |
| | | | 711/133 |
| 2023/0144662 A1 * | 5/2023 | Tasinga | G06F 9/5088 |
| | | | 718/105 |

(Continued)

FOREIGN PATENT DOCUMENTS

WO    WO-2023055532 A1 *    4/2023    ........... G06F 9/5016

OTHER PUBLICATIONS

L. Liu, Y. Li, Z. Cui, Y. Bao, M. Chen and C. Wu, "Going vertical in memory management: Handling multiplicity by multi-policy," 2014 ACM/IEEE 41st International Symposium on Computer Architecture (ISCA), Minneapolis, MN, USA, 2014, pp. 169-180.*

(Continued)

*Primary Examiner* — Pierre Michel Bataille
(74) *Attorney, Agent, or Firm* — Lowenstein Sandler LLP

(57) ABSTRACT

Apparatuses, systems, and techniques to manage a cache located on a processor of a computing system using eviction priority based on based on memory reuse. Memory addresses associated with a workload of an application executing using the processor are identified. An amount of reuse of the memory addresses corresponding to the workload is determined. A cache management policy for the workload is determined based on the amount of reuse. The cache management policy is applied to the cache.

20 Claims, 15 Drawing Sheets

(56) References Cited

U.S. PATENT DOCUMENTS

2023/0418765 A1\* 12/2023 Tune .................... G06F 12/128
2024/0355044 A1\* 10/2024 Emberling ............. G06F 9/544

OTHER PUBLICATIONS

A. Arunkumar, S. -y. Lee and C.-j. Wu, "ID-cache: instruction and memory divergence based cache management for GPUs," 2016 IEEE International Symposium on Workload Characterization (IISWC), Providence, RI, USA, 2016, pp. 1-10.\*
A. Pan and V. S. Pai, "Runtime-driven shared last-level cache management for task-parallel programs," SC '15: Proceedings of the International Conference for High Performance Computing, Networking, Storage and Analysis, Austin, TX, USA, 2015, pp. 1-12.\*
Y. Yu, C. Zhang, W. Wang, J. Zhang and K. B. Letaief, "Towards Dependency-Aware Cache Management for Data Analytics Applications," in IEEE Transactions on Cloud Computing, vol. 10, No. 1, pp. 706-723, Jan. 1-Mar. 2022.\*
I. jibaja and K. A. Shaw, "Understanding the applicability of CMP performance optimizations on data mining applications," 2009 IEEE International Symposium on Workload Characterization (IISWC), Austin, TX, USA, 2009, pp. 227-236.\*

\* cited by examiner

CACHE MANAGEMENT USING EVICTION PRIORITY BASED ON MEMORY REUSE

TECHNICAL FIELD

At least one embodiment of the present disclosure pertains to processing resources used to perform and facilitate cache management. For example, one embodiment pertains to processors or computing systems used to manage a cache using eviction priority based on memory reuse.

BACKGROUND

A computing system can include one or more caches that store data. The computing system can include, for example, an L1 cache, and L2 cache, and an L3 cache. In general, a computing system can utilize a cache to temporarily store data retrieved from off-chip memory (e.g., DRAM). The computing system can read data from and write data to the cache faster than it can read data from and write data to the off-chip memory. There are many techniques to retain data within the cache, including utilizing cache controls to allow programmers to select specific data to persist within the cache.

BRIEF DESCRIPTION OF THE DRAWINGS

The present disclosure is illustrated by way of example, and not by way of limitation, in the figures of the accompanying drawings.

DETAILED DESCRIPTION

Figure 1:
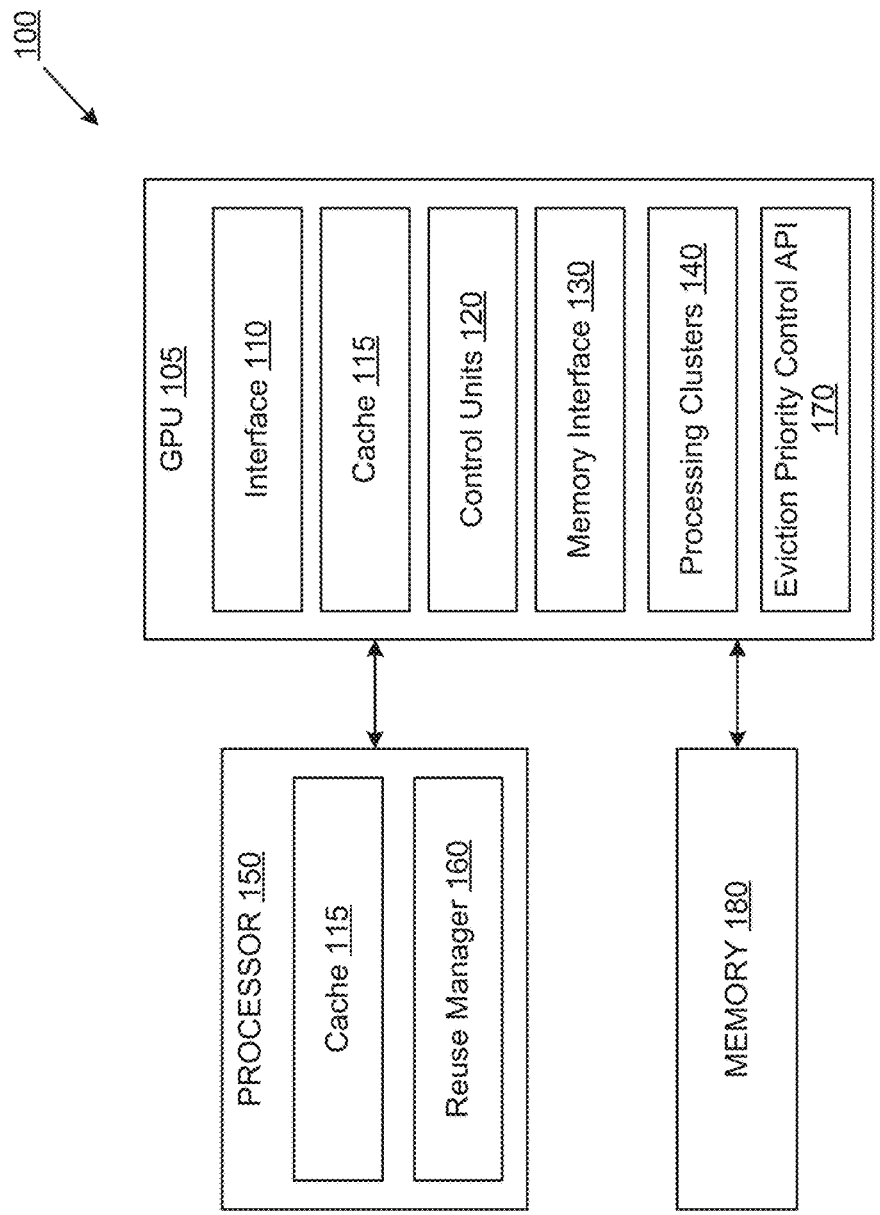
FIG. 1 illustrates an example computing system, in accordance with at least one embodiment of the present disclosure.

Aspects of the present disclosure generally relate to a to cache management using eviction priority based on memory reuse. According to one or more embodiments of the present disclosure, a processor of a computing system can retrieve data from an off-chip (e.g., off-processor) memory (e.g., DRAM) and temporarily store the data in a cache. The processor can read data from and write data to the cache faster than it can retrieve read data from and write data to off-chip memory. However, cache memory space is often limited. Accordingly, cache management is an important aspect of modern computing systems with processor caches. A well-managed cache can effectively reduce off-chip memory access, related power consumption, and significantly improve overall system performance. Caches have been managed mainly through hardware (e.g., a cache controller), and prior efforts to improve cache management have been limited to improving hardware implementations.

Conventional cache management policies (e.g., hardware-based cache management implementations) often fail to reduce off-chip (e.g., DRAM) traffic of transient data. Transient data is data that is only relevant for a limited period of time. For example, activation data associated with an inference application of a neural network (NN) may be transient data that is only temporarily useful to the inference application of the NN (also referred to as "NN inference application" herein). Activation data is data generated by one layer of a NN and passed onto a subsequent layer of the NN during inference. Once the activation data is used by the subsequent layer of the NN inference application, it may no longer be useful to the NN. In conventional implementations of a NN inference application, activation data associated with the NN inference application may not be retained within a cache. For example, during execution of the neural network, an iteration of one layer of the NN may read activation data from DRAM and write the output activation data to a cache that is eventually evicted from the cache, and stored back in DRAM. However, an iteration of a subsequent layer of the NN may require the activation data for inference; therefore, the activation data may be written from DRAM back to the cache for the iteration of the subsequent layer of the NN to use. Because activation data may be used by one or more layers of the NN, and then may no longer be useful to the NN, systems that automatically writeback activation data to DRAM needlessly create additional traffic over the interface to DRAM.

Aspects and implementations of the present disclosure address the above and other deficiencies by introducing a technique that determines a cache management policy that reduces traffic between a cache (e.g., a processor cache) and off-chip memory (e.g., DRAM) associated with an application's workload. In at least one embodiment, the introduced technique allows a computing system to leverage memory buffer allocations to perform operations and processing tasks, such as, for example and without limitation, inferencing operations executed using a neural network or other machine learning model. For example, a NN inference application may allocate one or more shared activation memory buffers within DRAM to temporarily store activation data associated with the NN inference application. The computing system may store activation data across layers of the NN inference application in the one or more of the shared activation data memory buffers. The computing system may identify multiple memory addresses associated with the activation data stored within the shared activation data memory buffers. In at least one embodiment, the memory addresses may include ranges of virtual addresses for a given workload of the NN inference application. The computing system can identify memory addresses suitable for reuse based on a quantitative metric. In at least one embodiment, the quantitative metric may be a total reuse factor that indicates a number of layers of the application (NN inference application) that access the memory addresses to retrieve the corresponding activation data. Accordingly, the quantitative metric (e.g., the total reuse factor) indicates memory address reuse between layers of the inference network. The computing system can determine a cache management policy that retains a range of memory addresses with the highest total reuse factor within the cache and apply the cache management policy to the cache.

In at least one embodiment, the computing system can apply the cache management policy to the cache using one or more software-managed eviction priority controls. Unlike hardware implementations, eviction priority controls allow programmers to explicitly control the cache management process via a software application programming interface (API). The technique allows programmers to co-manage a previously hardware-only managed cache using software. The eviction priority controls allow programmers to designate tags for memory addresses associated with a workload of an application executing on a computing system via the eviction priority controls API. In at least one embodiment, the tags may include, for example and without limitation, an evict-last tag, an evict-normal tag, and an evict-first tag. The cache will evict data stored at a memory address tagged as evict-first before data stored at a memory address tagged as evict-normal and evict-last. The cache will evict data stored at a memory address tagged as evict-normal before it evicts data stored at a memory address tagged as evict-last. Accordingly, the eviction priority controls designate a priority level for retaining data within the cache, as described in detail below. The computing system can apply the appropriate (desired) cache management policy to the cache by designating the evict-last tag for each memory address of a range of memory addresses selected according to the quantitative metric.

With the transparency and accessibility of data in a cache afforded by the eviction priority control API, one or more embodiments of the present disclosure is able to readily prioritize data in a cache to execute a cache management policy that reduces traffic between the cache and DRAM. For example, the computing system can designate memory addresses with the highest total reuse factor as evict-last, thereby retaining activation data with a high amount of reuse within the cache. Moreover, since the introduced technique analyzes memory address reuse on a per-workload basis, it can tailor each cache management policy to each workload and can significantly increase a cache hit rate and reduce traffic over the interface to DRAM compared to using a general cache management policy. The increased cache hit rate and reduced traffic over the interface to DRAM can unlock unrealized performance constrained by inefficient cache management. Accordingly, the introduced technique reduces off-chip data access and related power consumption, improving the system's overall energy efficiency and latency, and allowing the system to increase an overall frequency, thereby improving performance.

It should be noted that various aspects of the above-referenced methods and systems are described in detail herein below by way of example, rather than by way of limitation. The embodiments and examples provided below may reference neural network inference applications for the purpose of simplicity and brevity only. However, embodiments and examples of the present disclosure can be applied to applications with repetitive tasks occurring at a programmatic level. For example, aspects and embodiments of the present disclosure can be applied to high-performance computing applications.

FIG. 1 illustrates an example computing system, in accordance with some embodiments of the present disclosure. The computing system 100 provides an example of a hardware accelerator, a GPU 105, included in the system 100 with one or more other devices. The computing system 100 can be embodied on a single semiconductor substrate and include other devices such as additional GPUs. The GPU 105 can be coupled to the additional GPUs via one or more interconnects, such as high-speed interconnects. GPU 105 can be coupled to a processor 150 and a memory 180. The processor 150 can be another GPU or a host processor such as a CPU. The memory 180 can include multiple memory devices.

The computing system 100, or at least a portion of the computing system, can be on a cloud computing platform. For example, the GPU 105, the processor 150, the memory 180, or a combination of two or more can be on a server located in a cloud computing environment, such as in a data center. The data center can be a GPU data center. One or more of the GPU 105, the processor 150, and the memory 180 can also be distributed on different computing devices and the computing devices can be distal from one another. For example, the processor 150 and memory 180 can be located on one computing device or system and the GPU 105 can be located on another computing device or system.

The GPU 105 includes an interface 110, control units 120, a memory interface 130, processing clusters 140, and eviction priority control API 170. The GPU 105 can include additional components that are not illustrated but are typically included in a GPU, such as communication buses and interconnects.

Interface 110 is an input and output interface configured to communicate data, commands, and other information, with external components, such as the processor 150. Interface 110 can transmit and receive data and commands over conventional interconnects. Received communications can be sent to the various components of the GPU 105, such as the control units 120.

The control units 120 are configured to manage processing streams, configure the processing cluster 140 for processing tasks defined by the streams, distribute the tasks to processing cluster 140, and manage the execution of the tasks on the processing cluster 140. The results generated by the tasks can be directed to the memory interface 130. The memory interface 130 is configured to store the results in a memory, such as the memory 180. In addition to writing to the memory 180, the memory interface 130 is also configured to read data from the memory 180. The memory 180 can also store software or code corresponding to algorithms used by the disclosed systems, methods, or apparatuses. The code may include a series of operating instructions that can direct operations of the processing clusters 140. The memory 180 can be or include a non-transitory computer-readable medium. The processing cluster 140 includes multiple processing cores for processing the tasks. The processing cluster 140 can include a pipeline manager that directs the operation of the processing cores for parallel processing of the tasks. The processing cluster 140 can also include additional components for processing the tasks, such as a memory management unit.

Processor 150 includes a cache 115 (e.g., a processor cache). In at least one embodiment, the cache 115 is an on-chip cache located on a same chip as the processor 150, and can include multiple cache levels (L1, L2, L3, and L4). In at least one embodiment, cache 115 is located on GPU 105. In at least one embodiment, cache 115 operates according to a least recently used (LRU) eviction scheme. A cache operating according to an LRU eviction scheme first evicts the least recently used data stored in the cache to make room for new data. Accordingly, an LRU eviction scheme prioritizes keeping recently accessed data within the cache.

Processor 150 includes a reuse manager 160. In at least one embodiment, reuse manager 160 can identify multiple memory addresses associated with a workload of an application executing on the computing system 100. Reuse manager 160 can identify a quantitative metric associated with the memory addresses. In at least one embodiment, the application is a neural network (NN) inference application, and the memory addresses can be virtual addresses for a given workload of the NN inference application. In such an embodiment, the quantitative metric can indicate an amount of reuse of the memory addresses according to the given workload. In some embodiments, reuse manager 160 may perform operations described herein using software (e.g., instructions running or executing on processor 150). In some embodiments, reuse manager 160 may perform operations described herein using processing logic that may include hardware (e.g., a processing device, circuitry, dedicated logic, microcode, hardware of a device, integrated circuit, etc.). In some embodiments, reuse manager 160 may perform operations described herein using a combination of processing logic and software.

Management of data allocations in the cache 115 is performed using an API, such as eviction priority control API 170. In at least one embodiment, eviction priority control API can implement an eviction priority control feature introduced in NVIDIA's Ampere architecture. The eviction priority control feature allows programmers to manage a cache (e.g., cache 115) using software. The eviction priority control feature allows programmers to designate tags for memory addresses associated with a workload of an application executing on computing system 100. In at least one embodiment, the tags include an evict-last tag, an evict-normal tag, and an evict-first tag. The tags can set a priority level for a particular location in the cache. The priority level determines at what point data associated with the particular location in the cache can be evicted from the cache. For example, the evict-last tag can set a first priority level, the evict-normal tag can set a second priority level, and the evict-first tag can set a third priority level, as described in detail below. It can be noted that operations described with respect to eviction priority control API 170 are described to implement NVIDIA's cache control feature by way of illustration, and not by way of limitation. In at least one embodiment, other or similar methods of managing cache evictions may be utilized in conjunction with the memory reuse identification techniques described herein.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media or non-transitory computer-readable medium, e.g., magnetic or optical disks, random-access memory (RAM), magnetic hard disks, flash memories, and/or read-only memory (ROM), to allow various types of digital data processors or computers to perform one, multiple or all of the steps of one or more of the above-described methods, or functions, systems or apparatuses described herein.

The digital data processors or computers can be comprised of one or more processing units or processors. The processing unit may include one or more hardware accelerators such as GPUs, a deep learning accelerator, a vision processing unit, a tensor processing unit, one or more CPUs, one or more of other processor types, or a combination thereof. The digital data processors and computers can be located proximate each other, proximate a user, in a cloud environment, a data center, or located in a combination thereof. For example, some components can be located proximate the user and some components can be located in a cloud environment or data center.

The processing units in the processors or computers, such as GPUs, can be embodied on a single semiconductor substrate, included in a system with one or more other devices such as additional GPUs, a memory, and a CPU. The GPUs may be included on a graphics card that includes one or more memory devices and is configured to interface with a motherboard of a computer. The GPUs may be integrated GPUs (iGPUs) that are co-located with a CPU on a single chip. Configured or configured to means, for example, designed, constructed, or programmed, with the necessary logic and/or features for performing a task or tasks.

The processors or computers can be part of GPU racks located in a data center. The GPU racks can be high-density (HD) GPU racks that include high-performance GPU compute nodes and storage nodes. The high-performance GPU compute nodes can be servers designed for general-purpose computing on graphics processing units (GPGPU) to accelerate deep learning applications. For example, the GPU compute nodes can be servers of NVIDIA's DGX product line.

Figure 2:
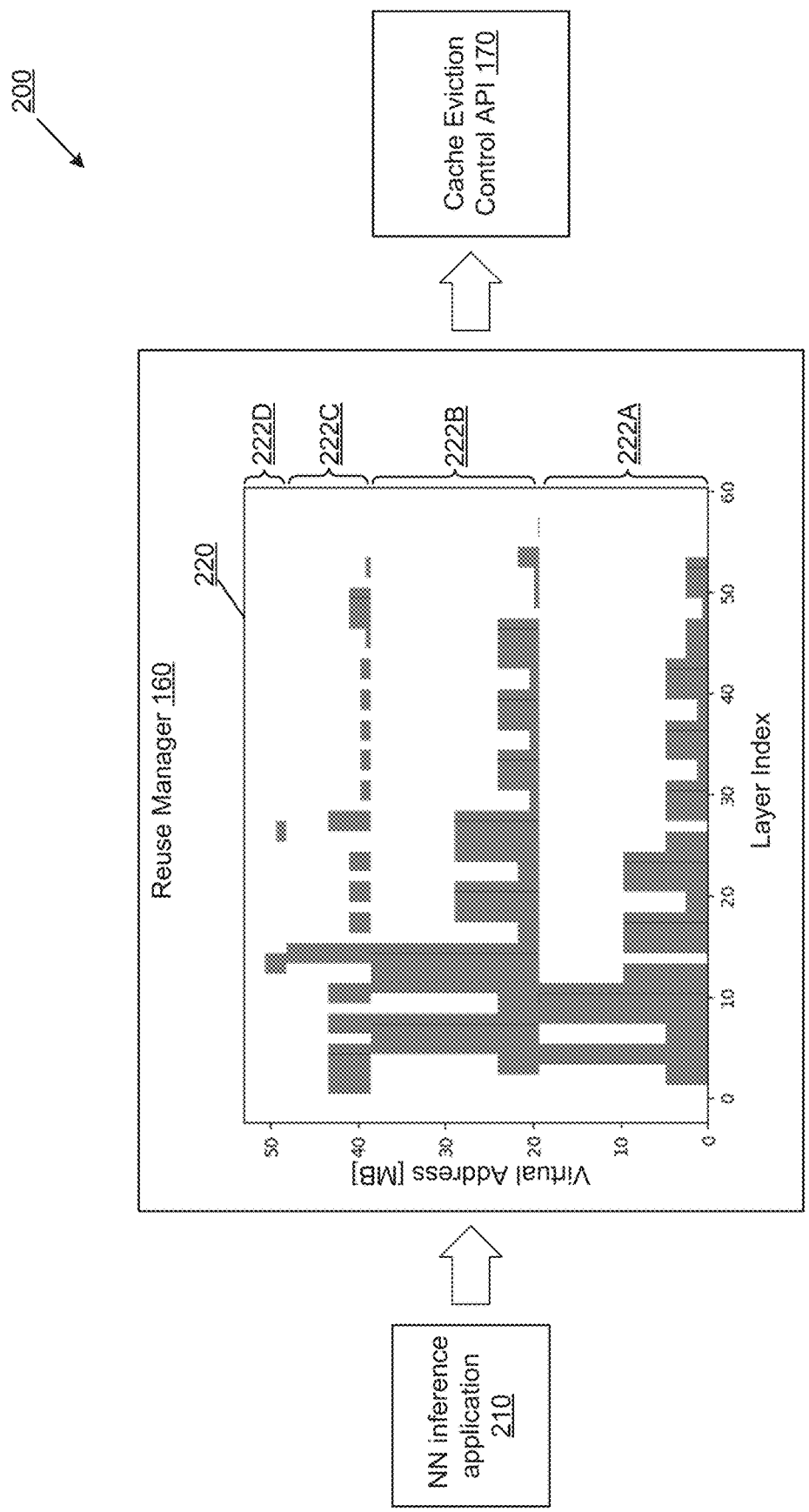
FIG. 2 is a diagram illustrating a cache management technique, in accordance with at least one embodiment of the present disclosure.

FIG. 2 is a diagram illustrating a cache management technique, in accordance with some embodiments of the present disclosure. Diagram 200 may include similar elements illustrated by computing system 100, as described with respect to FIG. 1. It should be noted that elements of FIG. 1 can be used herein to help describe FIG. 2. The operations described with respect to FIG. 2 are shown to be performed serially for sake of illustration, rather than limitation. Although shown in a particular sequence or order, unless otherwise specified, the order of operations can be modified. Thus, the illustrated embodiments should be understood only as examples, and the illustrated operations can be performed in a different order, while some operations can be performed in parallel. Additionally, one or more operations can be omitted in at least one embodiment. Thus, not all illustrated operations are required in every embodiment, and other process flows are possible. In at least one embodiment, the same, different, fewer, or greater operations can be performed. Diagram 200 illustrates a cache management technique that utilizes a reuse manager 160 to determine a cache management policy for a workload of a NN inference application 210 (e.g., an inference application of a NN) and deploy (e.g., by using an eviction priority control API 170) the cache management policy to a cache (e.g., a processor cache).

The NNs described herein can include multiple layers of connected nodes that can be trained with input data to solve complex problems. For example, images can be used as input data for constructing, training, and deploying a NN model for image classification or object detection. Once the NN is trained, the NN can be deployed and used to identify and classify objects or patterns in an inference process through which NN inference application 210 processes information from a given input to infer a result. During an inference process for a given workload, NN inference application 210 can perform at least two types of memory accesses: a memory access to retrieve weight data (generally referred to as "weights" herein) and bias data (generally referred to as "biases" herein) and memory access to retrieve activation data. Weights and biases are inputs that correspond to individual nodes of the NN, and can be fetched by layers of NN inference application 210 from DRAM. Activation data is intermediate data that can be generated by an iteration of one layer of the NN inference application 210 and passed to and iteration of a next layer of the NN inference application 210 to be used by the iteration of next layer or an iteration of a subsequent layer of the NN inference application 210. For example, during execution of the NN, an iteration of a first layer of the NN inference application 210 can generate activation data that an iteration of a subsequent layer of the NN inference application 210 may consume. In at least one embodiment, once the iteration of the subsequent layer of the NN inference application 210 uses/consumes the generated activation data, the NN inference application 210 may have no additional need for the generated activation data. Accordingly, activation data may be transient data that is temporarily useful to NN inference application 210.

Memory address space may be allocated within DRAM for activation data. Because of the transient nature of activation data, in at least one embodiment, activation data across layers of NN inference application 210 can be temporarily stored in one or more shared activation data memory buffers. New activation data within the share activation data buffer may overwrite old activation data within the activation data buffer. For example, memory can be allocated for temporary storage of activation data, as illustrated by memory usage map 220. Memory allocated for activation data can be logically partitioned into activation data memory buffer 222A, activation data memory buffer 222B, activation data memory buffer 222C, and activation data memory buffer 222D (generally referred to as "activation buffers 222" or "memory blocks 222" herein).

Reuse manager 160 can identify reuse of activation data across layers of an NN inference application 210. In at least one embodiment, reuse manager 160 can identify reuse of memory addresses associated with activation data based on a quantitative metric. The quantitative metric may be a heuristic or an algorithm that aims to approximate an amount of traffic specific memory addresses generated between a cache (e.g., an L2 cache, cache 115, etc.) and off-chip memory (e.g., DRAM). Traffic can be generated between the cache and off-chip memory by data being read from DRAM, written to the cache, and by data being evicted from the cache and written to DRAM. In at least one embodiment, the quantitative metric can include a total reuse factor that indicates a number of layers of the NN inference application 210 that access the memory addresses associated with the activation data. In an illustrative example, before runtime of NN inference application 210, reuse manager 160 can analyze memory usage map 220 to determine (e.g., an amount or level of) memory address reuse, as described below with respect to FIG. 3.

Figure 3:
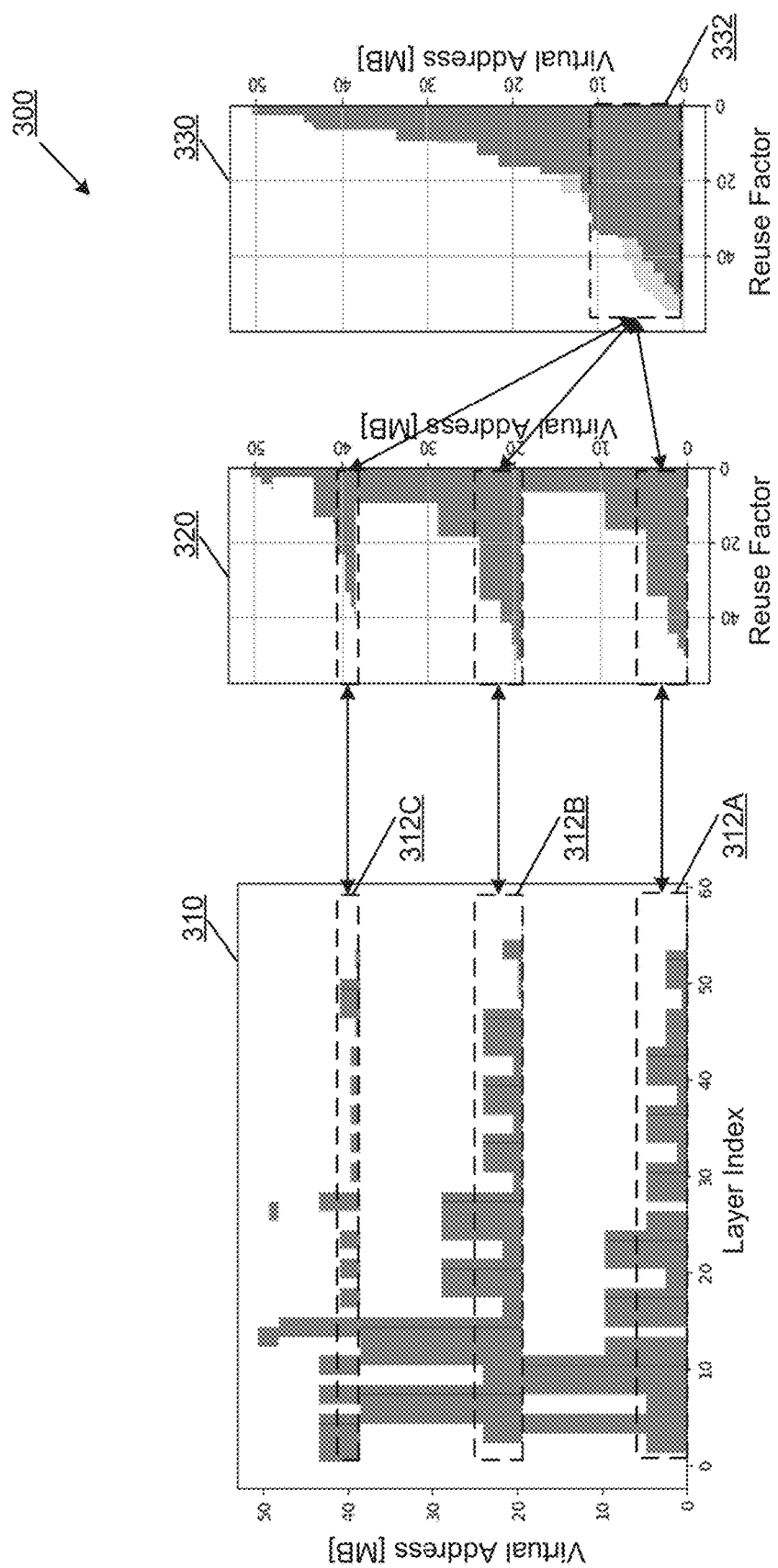
FIG. 3 illustrates determining reuse of memory addresses associated with activation data, in accordance with at least one embodiment of the present disclosure.

FIG. 3 illustrates determining (e.g., an amount or level of) reuse of memory addresses associated with activation data, in accordance with embodiments of the present disclosure. Memory usage map 310 illustrates four memory blocks allocated within DRAM for storage of activation data that one or more layers of NN inference application 210 may access. Memory usage map 310 can be the same or similar to memory usage map 220, as described with respect to FIG. 2. It can be noted that aspects of the present disclosure can be applied to any number of memory blocks or other memory allocation methods within DRAM, FIG. 3 illustrates an embodiment with four memory blocks by way of illustration, and not by way of limitation. The Y-axis of memory usage map 310 represents virtual addresses associated with the memory blocks allocated for activation data of NN inference application 210. In the illustrated embodiment, 50 megabytes (MB) have been allocated within DRAM for activation data. The X-axis represents a layer index for layers of the NN inference application 210. In the illustrated embodiment, the NN inference application 210 includes 50 NN layers. Reuse manager 160 can determine a reuse factor for each virtual address according to the memory usage map 310. The reuse factor can be a quantitative metric that indicates a number of the 50 NN layers that access a given virtual memory address. Graph 320 illustrates the reuse factors for each virtual address of the range of virtual addresses associated with the memory blocks.

Reuse manager 160 can select the most reused virtual addresses for retaining with a cache. In at least one embodiment, reuse manager 160 can sort the virtual addresses according to their respective reuse factors, as illustrated with respect to graph 330. Reuse manager 160 can select virtual addresses 332 with the greatest reuse factors from the sorted virtual addresses up to a threshold amount. The threshold amount can be determined by a developer or a user parameter, as discussed in further detail below. In the illustrated example, the threshold amount is 10 MBs of a virtual address space, as illustrated by the selected virtual addresses 332. The selected virtual addresses 332 include a first range of virtual addresses 312A from a first memory block of virtual addresses, a second range of virtual addresses 312B from a second block of virtual addresses, and a third range of virtual addresses 312C from a third block of virtual addresses.

Returning to FIG. 2, as mentioned above, a quantitative metric may be a heuristic or an algorithm that determines an amount of traffic specific memory addresses generated between a cache (e.g., a processor cache) and off-chip memory (e.g., DRAM). In at least one embodiment, the quantitative metric can include a number of layers of a NN inference application that access virtual addresses associated with activation data of a given workload, as described above with respect to FIG. 3. Accordingly, the quantitative metric may be used to determine (e.g., an amount or level of) memory reuse across multiple memory addresses. It can be noted that, in at least one embodiment, differing quantitative metrics may be used to determine memory address reuse. For example, the quantitative metric can include a number of instances each layer of a workload of a NN inference application accesses activation data associated with virtual addresses. Such a quantitative metric may similarly indicate an amount of reuse of the virtual addresses throughout execution of a workload of the NN inference application.

eviction priority control API 170 can be configured to apply a cache management policy to a cache (e.g., cache 115) according to a quantitative metric that indicates an amount of reuse of memory addresses. In at least one embodiment, the memory addresses may include virtual addresses associated with activation data of a workload of a NN inference application, as described above. Eviction priority control API 170 may receive a range of memory addresses (e.g., virtual addresses associated with a NN inference workload) from reuse manager 160. eviction priority control API 170 can determine a cache management policy that retains the received range of memory addresses within the cache. In at least one embodiment, retaining the received range of memory addresses within the cache may include preventing data associated with the virtual addresses from being written back to an off-chip memory (e.g., DRAM).

In at least one embodiment, eviction priority control API 170 can utilize eviction priority controls (e.g., the eviction priority control feature introduced in NVIDIA's Ampere architecture) to apply the cache management policy to the cache. In at least one embodiment, the eviction priority controls can include three tags for L2 cache memory addresses. The tags may include an evict-last tag, an evict-normal tag, and an evict-first tag. The tags set a priority level for a particular memory location in the cache. The priority level determines when data associated with the particular location in the cache can be evicted from the cache. The evict-last tag sets a first priority level for data associated with the tagged address. Data stored in a cache at a memory location tagged as evict-last will be evicted last from the cache. In at least one embodiment, the evict-last tag may disable the automatic write-back mechanisms associated with the cache. If data stored at a memory address tagged as evict-last is modified, the modified data (also referred to as "dirty data") will not be automatically written back to DRAM. The evict-normal tag sets a second priority level for data associated with the tagged address. Data stored in the cache at a memory location tagged as evict-normal will be evicted before data stored in the cache at a memory location tagged as evict-last. The evict-first tag sets a third priority level for data associated with the tagged address. Data stored in the cache at a memory location tagged as evict-first will be evicted from the cache before data stored in the cache at memory addresses tagged as evict-normal and evict-last. In at least one embodiment, data stored in the cache at a memory location tagged as evict-first will be evicted from the cache before data stored in the cache at a memory location with no eviction priority control tag. It can be noted that the cache can utilize eviction priority controls in conjunction with an existing cache eviction scheme. For example, eviction priority control API 170 can designate eviction priority controls that operate in conjunction with a least recently used (LRU) eviction scheme. An LRU eviction scheme first evicts the least recently used data stored in the cache to make room for new data. The LRU algorithm determines the least recently used data by maintaining a timestamp that is updated when data is written to the cache or when data is read from the cache. Memory addresses within an LRU-managed cache designated as evict-normal may be evicted from the cache according to the LRU algorithm. The LRU-managed cache may evict memory addresses designated as evict-first before evicting memory addresses without the evict-first tag. The LRU-managed cache may evict memory addresses designated as evict-last after eviction memory addresses without the evict-first tag. In at least one embodiment, the eviction priority controls described herein can be implemented in conjunction with a least frequently used (LFU) eviction scheme, a first-in-first-out (FIFO) eviction scheme, etc.

In at least one embodiment, at the end of a workload of an application (e.g., a NN inference application), eviction priority control API 170 may demote memory addresses to a standard priority level. Demoting memory addresses to a standard priority level may include ceasing prioritization of retaining selected memory address ranges in the cache. For example, eviction priority control API 170 may designate memory addresses tagged as evict-first tag as evict-normal or may remove the evict-last tag altogether. As such, the cache may operate according to its default cache eviction scheme without the additional prioritization of certain memory addresses after runtime of the workload. In at least one embodiment, eviction priority control API 170 may promote (e.g., to an evict-last priority control) memory addresses or demote memory addresses during execution of the workload.

Figure 4A:
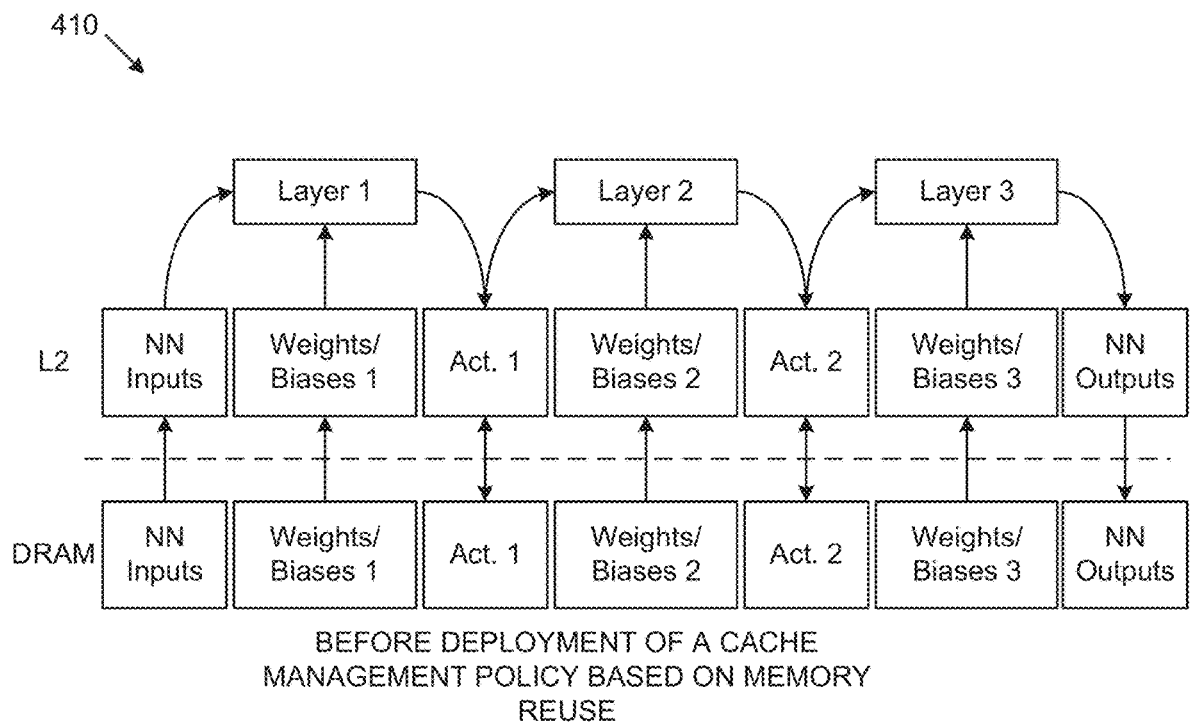
FIG. 4A illustrates an example of execution of a neural network (NN) inference application before deployment of a cache management policy based on memory reuse, in accordance with at least one embodiment of the present disclosure.

FIG. 4A illustrates an example of execution of a NN inference application before deployment of a cache management policy based on memory reuse, in accordance with embodiments of the present disclosure. As described above, at runtime of a NN inference application (e.g., NN inference application 210), activation data is generated by a first layer of the NN and used by a subsequent layer of the NN. One or more layers of the NN inference application may use weights and/or biases to apply transformations to the input data to produce a desired output from a last layer of the NN. Weights and biases fetched by one or more layers of the NN inference application and activation data between the layers of the NN inference application are read from DRAM through an L2 cache during execution of the NN inference application. Before deployment of the cache management policy, the activation data between the layers of the NN inference application are written back from the L2 cache to DRAM.

Figure 4B:
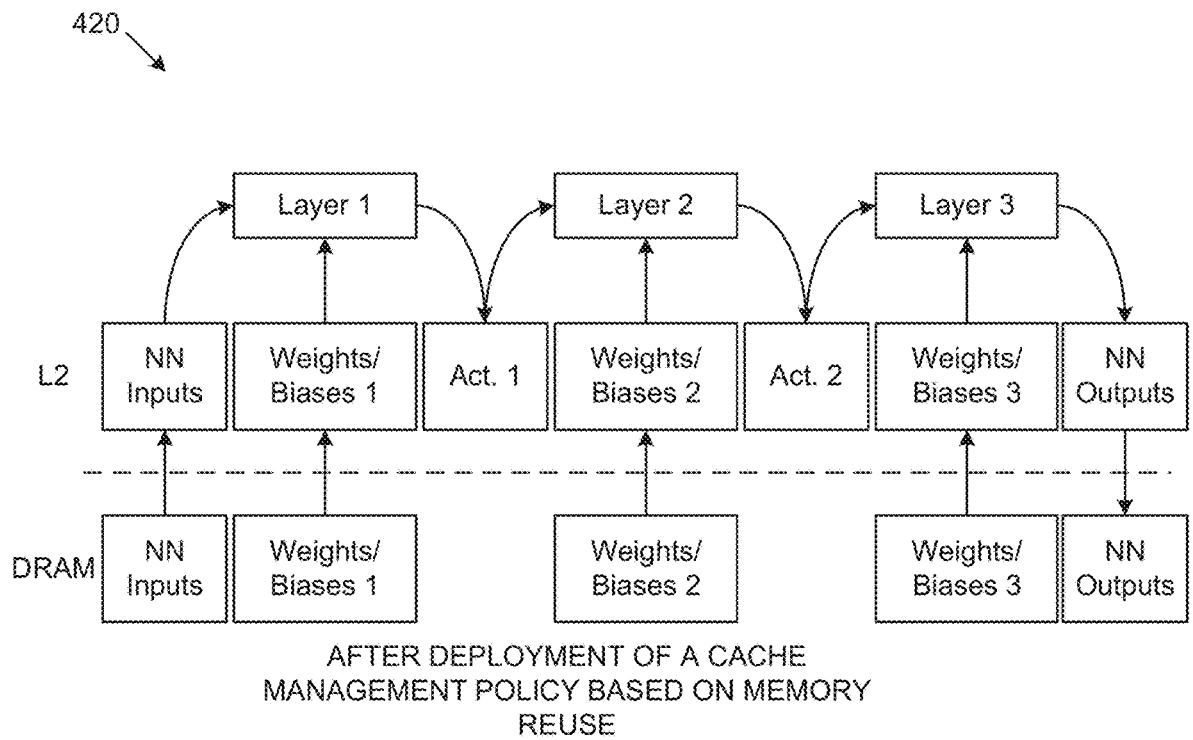
FIG. 4B illustrates an example of execution of a NN inference application after deployment of a cache management policy based on memory reuse, in accordance with at least one embodiment of the present disclosure.

FIG. 4B illustrates an example of execution of a NN inference application after deployment of a cache management policy based on memory reuse, in accordance with embodiments of the present disclosure. After deployment of the cache management policy, the activation data between the layers of the NN inference application are directly written to and read from the L2 cache during NN inference.

The amount of activation data that can be stored within the L2 cache depends on the capacity of the L2 cache. Accordingly, the capacity of the L2 cache may not be large enough to store all the activation data of a given workload. In at least one embodiment, a user parameter may provide a threshold amount of memory address space for a given workload of NN inference application 210 that may be retained within the L2 cache at runtime. For example, a user of the NN inference application 210 can designate (e.g., via eviction priority control API 170) 10 MBs of L2 cache memory space for retaining virtual addresses associated with activation data of a workload of the NN inference application, as described with respect to FIG. 3. In at least one embodiment, a developer may determine threshold amount of virtual address space that can be retained within the L2 cache. Although not illustrated, in at least one embodiment, weights and/or biases can also be written to and read directly from the L2 cache.

Figure 5:
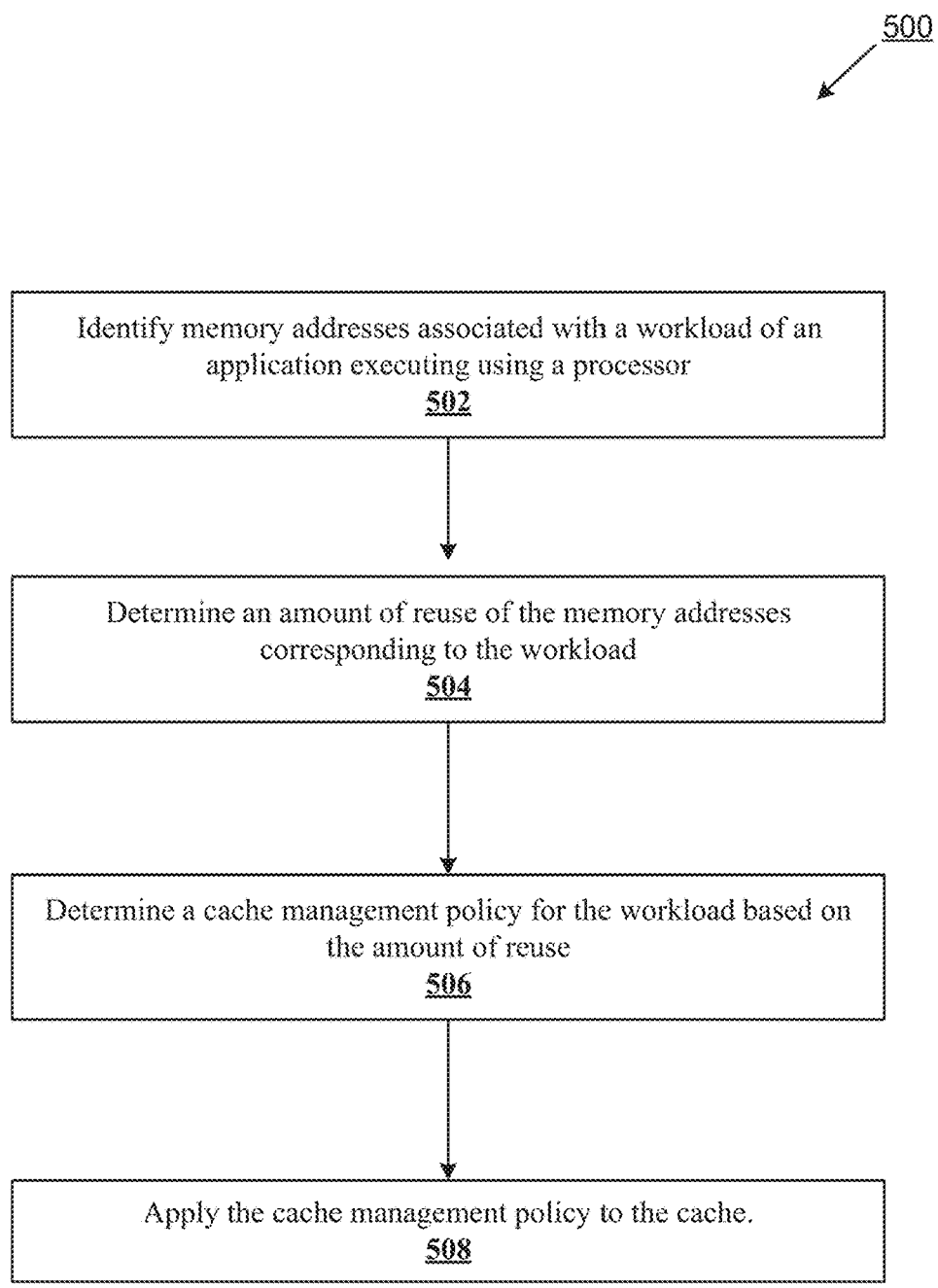
FIG. 5 depicts a flow diagram of an example method of managing a cache using eviction priority controls based on memory reuse, in accordance with at least one embodiment of the present disclosure.

FIG. 5 depicts a flow diagram of an example method for managing a cache using eviction priority controls based on memory reuse. The method 500 can be performed using processing logic that can include hardware (e.g., a processing device, circuitry, dedicated logic, microcode, hardware of a device, integrated circuit, etc.), software (e.g., instructions running or executing on a processing device), or a combination thereof. In at least one embodiment, the method 500 can be performed by a non-transitory computer-readable medium comprising instructions that, responsive to execution by a processor, cause the processor of a computing system to perform operations described herein. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment.

At operation 502 of method 500, memory addresses associated with a workload of an application executing using a processor are identified. In at least one embodiment, the application may include a neural network inference application and the memory addresses may be virtual addresses. In at least one embodiment, one or more of the virtual addresses may be associated with activation data of the workload of the NN inference application. In at least one embodiment, one or more of the virtual addresses may be associated with weight data of the workload of the NN inference application.

At operation 504, an amount of reuse of the memory addresses corresponding to the workload is determined. In at least one embodiment, the amount of reuse is computed according to a quantitative metric. In at least one embodiment, the quantitative metric includes a number of layers associated with the NN inference application that access the one or more virtual addresses associated with the activation data of the workload.

At operations 506, a cache management policy for the workload based on the amount of reuse is determined.

At operation 508, the cache management policy is applied to the cache. In at least one embodiment, processing logic may apply one or more eviction priority controls to one or more of the memory addresses based on the quantitative metrics. In at least one embodiment, processing logic may designate at least one of an evict-last eviction priority control, an evict-normal eviction priority control, or an evict-first eviction priority control for at least one memory address of the one or more memory addresses.

Inference and Training Logic

Figure 6A:
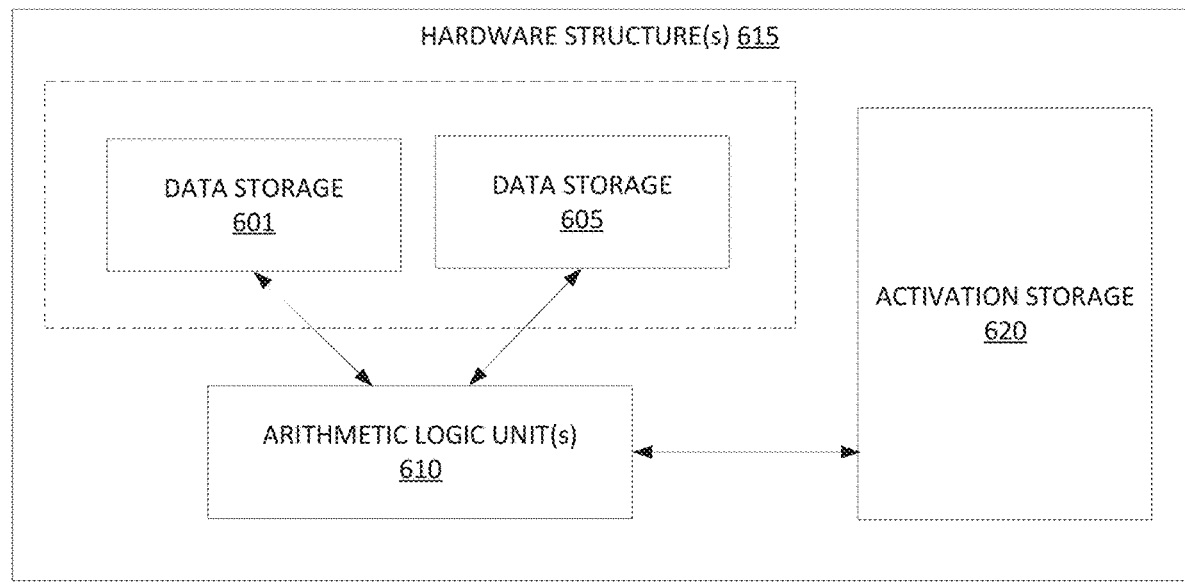
FIG. 6A illustrates inference and/or training logic, according to at least one embodiment.

FIG. 6A illustrates inference and/or training logic 615 used to perform inferencing and/or training operations associated with one or more embodiments. Details regarding inference and/or training logic 615 are provided below in conjunction with FIGS. 6A and/or 6B.

In at least one embodiment, inference and/or training logic 615 may include, without limitation, code and/or data storage 601 to store forward and/or output weight and/or input/output data, and/or other parameters to configure neurons or layers of a neural network trained and/or used for inferencing in aspects of one or more embodiments. In at least one embodiment, training logic 615 may include, or be coupled to code and/or data storage 601 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 601 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 601 may be included with other on-chip or off-chip data storage, including a processor's L1, L2, or L3 cache or system memory.

In at least one embodiment, any portion of code and/or data storage 601 may be internal or external to one or more processors or other hardware logic devices or circuits. In at least one embodiment, code and/or code and/or data storage 601 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 601 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 615 may include, without limitation, a code and/or data storage 605 to store backward and/or output weight and/or input/output data corresponding to neurons or layers of a neural network trained and/or used for inferencing in aspects of one or more embodiments. In at least one embodiment, code and/or data storage 605 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 615 may include, or be coupled to code and/or data storage 605 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 605 may be included with other on-chip or off-chip data storage, including a processor's L1, L2, or L3 cache or system memory. In at least one embodiment, any portion of code and/or data storage 605 may be internal or external to on one or more processors or other hardware logic devices or circuits. In at least one embodiment, code and/or data storage 605 may be cache memory, DRAM, SRAM, non-volatile memory (e.g., Flash memory), or other storage. In at least one embodiment, choice of whether code and/or data storage 605 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 601 and code and/or data storage 605 may be separate storage structures. In at least one embodiment, code and/or data storage 601 and code and/or data storage 605 may be same storage structure. In at least one embodiment, code and/or data storage 601 and code and/or data storage 605 may be partially same storage structure and partially separate storage structures. In at least one embodiment, any portion of code and/or data storage 601 and code and/or data storage 605 may be included with other on-chip or off-chip data storage, including a processor's L1, L2, or L3 cache or system memory.

In at least one embodiment, inference and/or training logic 615 may include, without limitation, one or more arithmetic logic unit(s) ("ALU(s)") 610, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 620 that are functions of input/output and/or weight parameter data stored in code and/or data storage 601 and/or code and/or data storage 605. In at least one embodiment, activations stored in activation storage 620 are generated according to linear algebraic and or matrix-based mathematics performed by ALU(s) 610 in response to performing instructions or other code, wherein weight values stored in code and/or data storage 605 and/or code and/or data storage 601 are used as operands along with other values, such as bias values, gradient information, momentum values, or other parameters or hyperparameters, any or all of which may be stored in code and/or data storage 605 or code and/or data storage 601 or another storage on or off-chip.

In at least one embodiment, ALU(s) 610 are included within one or more processors or other hardware logic devices or circuits, whereas in another embodiment, ALU(s) 610 may be external to a processor or other hardware logic device or circuit that uses them (e.g., a co-processor). In at least one embodiment, ALUs 610 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 601, code and/or data storage 605, and activation storage 620 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 620 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 620 may be cache memory, DRAM, SRAM, non-volatile memory (e.g., Flash memory), or other storage. In at least one embodiment, activation storage 620 may be completely or partially within or external to one or more processors or other logical circuits. In at least one embodiment, choice of whether activation storage 620 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 615 illustrated in FIG. 6A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 615 illustrated in FIG. 6A may be used in conjunction with central processing unit ("CPU") hardware, graphics processing unit ("GPU") hardware or other hardware, such as data processing unit ("DPU") hardware, or field programmable gate arrays ("FPGAs").

Figure 6B:
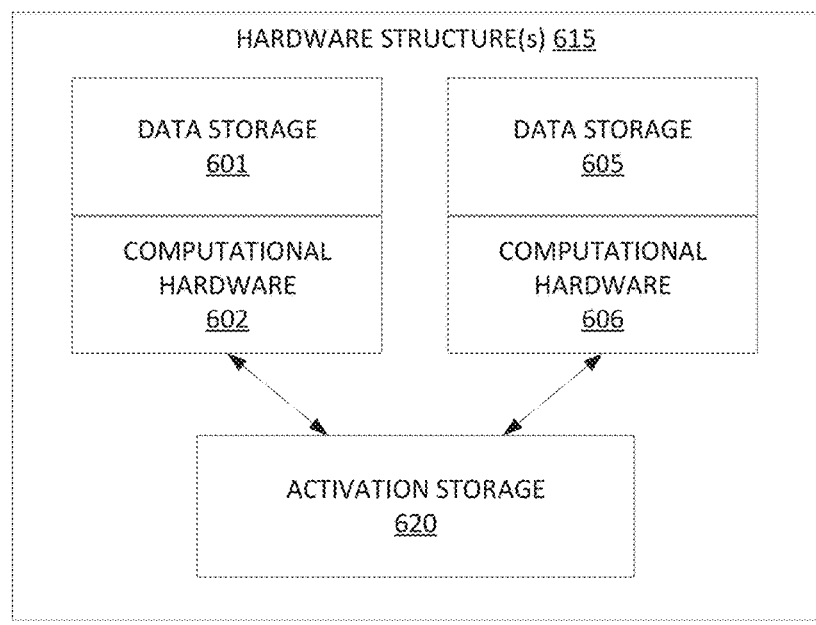
FIG. 6B illustrates inference and/or training logic, according to at least one embodiment.

FIG. 6B illustrates inference and/or training logic 615, according to at least one or more embodiments. In at least one embodiment, inference and/or training logic 615 may include, without limitation, hardware logic in which computational resources are dedicated or otherwise exclusively used in conjunction with weight values or other information corresponding to one or more layers of neurons within a neural network. In at least one embodiment, inference and/or training logic 615 illustrated in FIG. 6B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 615 illustrated in FIG. 6B may be used in conjunction with central processing unit (CPU) hardware, graphics processing unit (GPU) hardware or other hardware, such as data processing unit ("DPU") hardware, or field programmable gate arrays (FPGAs). In at least one embodiment, inference and/or training logic 615 includes, without limitation, code and/or data storage 601 and code and/or data storage 605, which may be used to store code (e.g., graph code), weight values and/or other information, including bias values, gradient information, momentum values, and/or other parameter or hyperparameter information. In at least one embodiment illustrated in FIG. 6B, each of code and/or data storage 601 and code and/or data storage 605 is associated with a dedicated computational resource, such as computational hardware 602 and computational hardware 606, respectively. In at least one embodiment, each of computational hardware 602 and computational hardware 606 comprises one or more ALUs that perform mathematical functions, such as linear algebraic functions, only on information stored in code and/or data storage 601 and code and/or data storage 605, respectively, result of which is stored in activation storage 620.

In at least one embodiment, each of code and/or data storage 601 and 605 and corresponding computational hardware 602 and 606, respectively, correspond to different layers of a neural network, such that resulting activation from one "storage/computational pair 601/602" of code and/or data storage 601 and computational hardware 602 is provided as an input to "storage/computational pair 605/606" of code and/or data storage 605 and computational hardware 606, in order to mirror conceptual organization of a neural network. In at least one embodiment, each of storage/computational pairs 601/602 and 605/606 may correspond to more than one neural network layer. In at least one embodiment, additional storage/computation pairs (not shown) subsequent to or in parallel with storage computation pairs 601/602 and 605/606 may be included in inference and/or training logic 615.

Data Center

Figure 7:
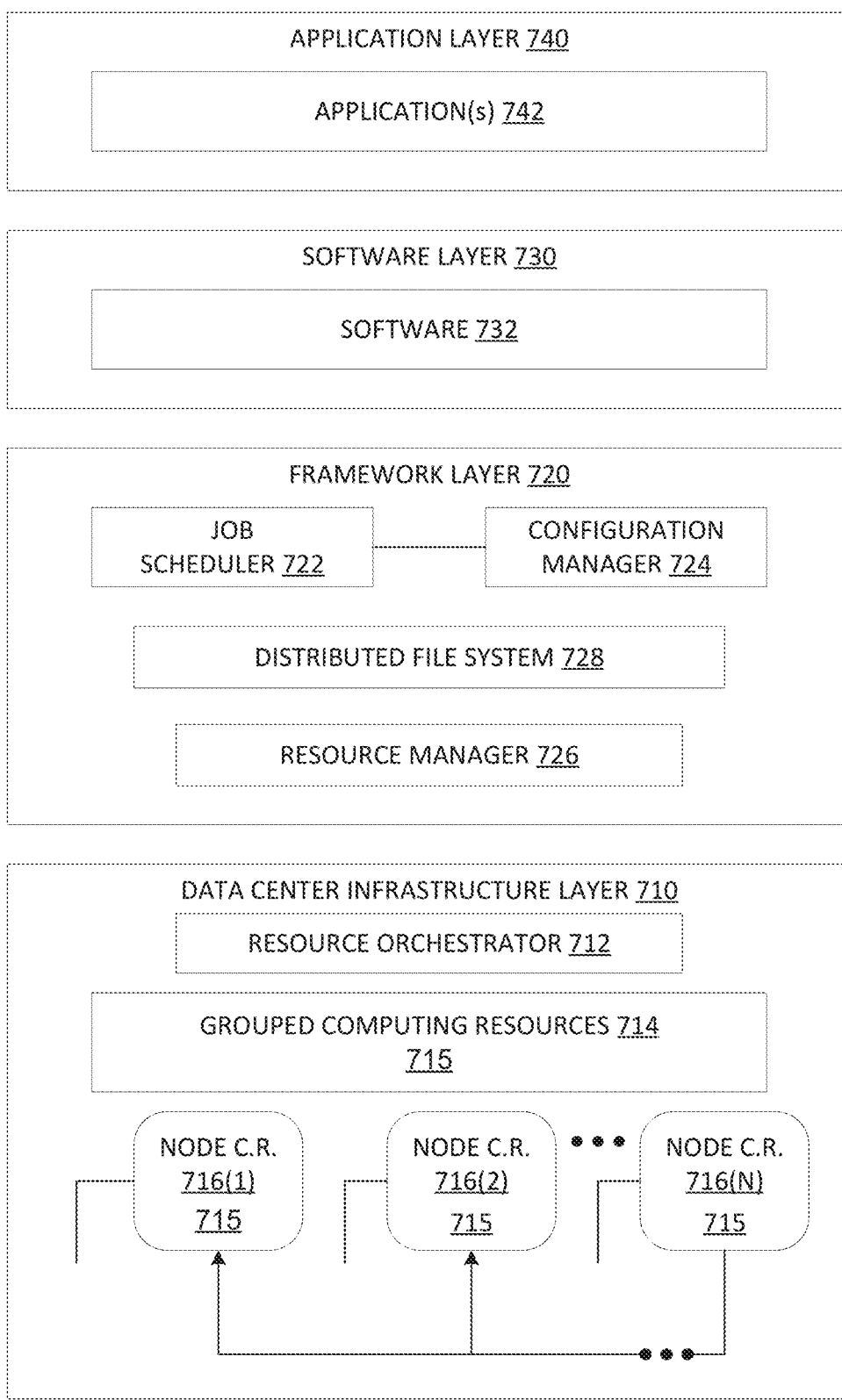
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), data processing units, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software, or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, DPUs FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 615 are used to perform inferencing and/or training operations associated with one or more embodiments. Details regarding inference and/or training logic 615 are provided below in conjunction with FIGS. 6A and/or 6B. In at least one embodiment, inference and/or training logic 615 may be used in system FIG. 7 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Computer Systems

Figure 8:
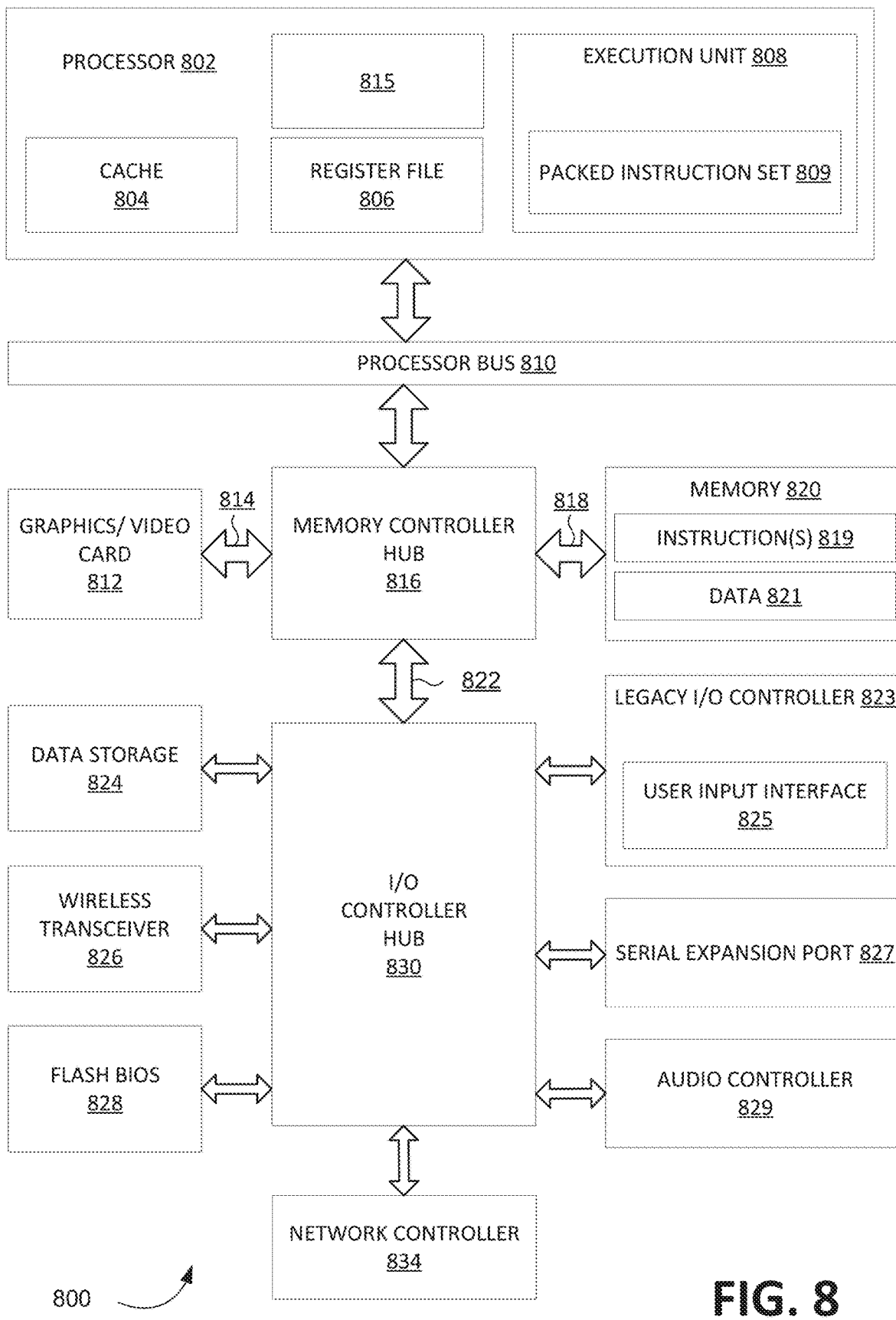
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, edge devices, Internet-of-Things ("IoT") devices, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment, computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834, which may include in some embodiments, a data processing unit. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Inference and/or training logic 615 are used to perform inferencing and/or training operations associated with one or more embodiments. Details regarding inference and/or training logic 615 are provided below in conjunction with FIGS. 6A and/or 6B. In at least one embodiment, inference and/or training logic 615 may be used in system FIG. 8 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 9:
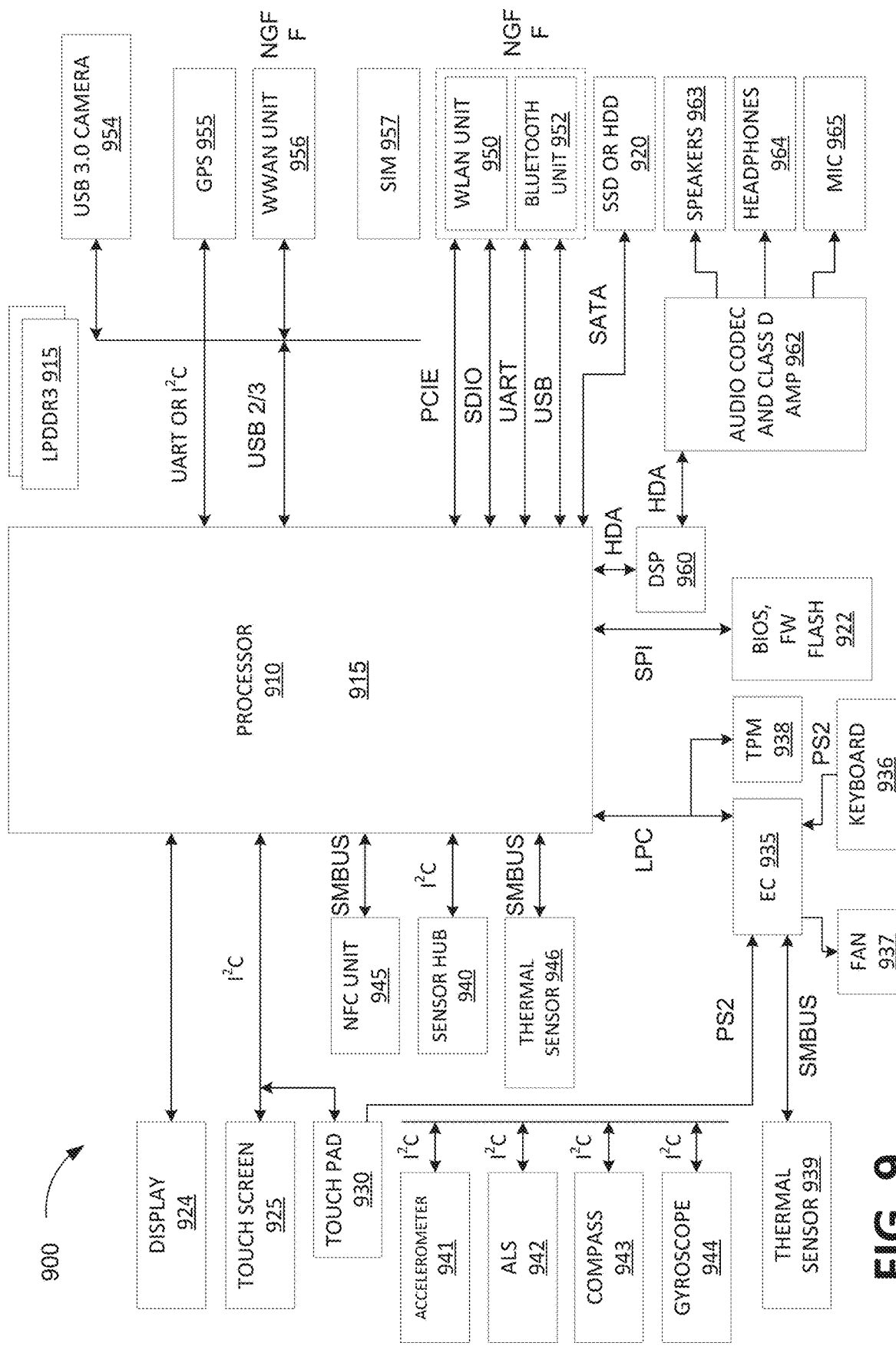
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, an edge device, an IoT device, or any other suitable electronic device.

In at least one embodiment, electronic device 900 may include, without limitation, processor 910 communicatively coupled to any suitable number or kind of components, peripherals, modules, or devices. In at least one embodiment, processor 910 coupled using a bus or interface, such as a I2C bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 936, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 962 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Inference and/or training logic 615 are used to perform inferencing and/or training operations associated with one or more embodiments. Details regarding inference and/or training logic 615 are provided below in conjunction with FIGS. 6A and/or 6B. In at least one embodiment, inference and/or training logic 615 may be used in system FIG. 9 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 10:
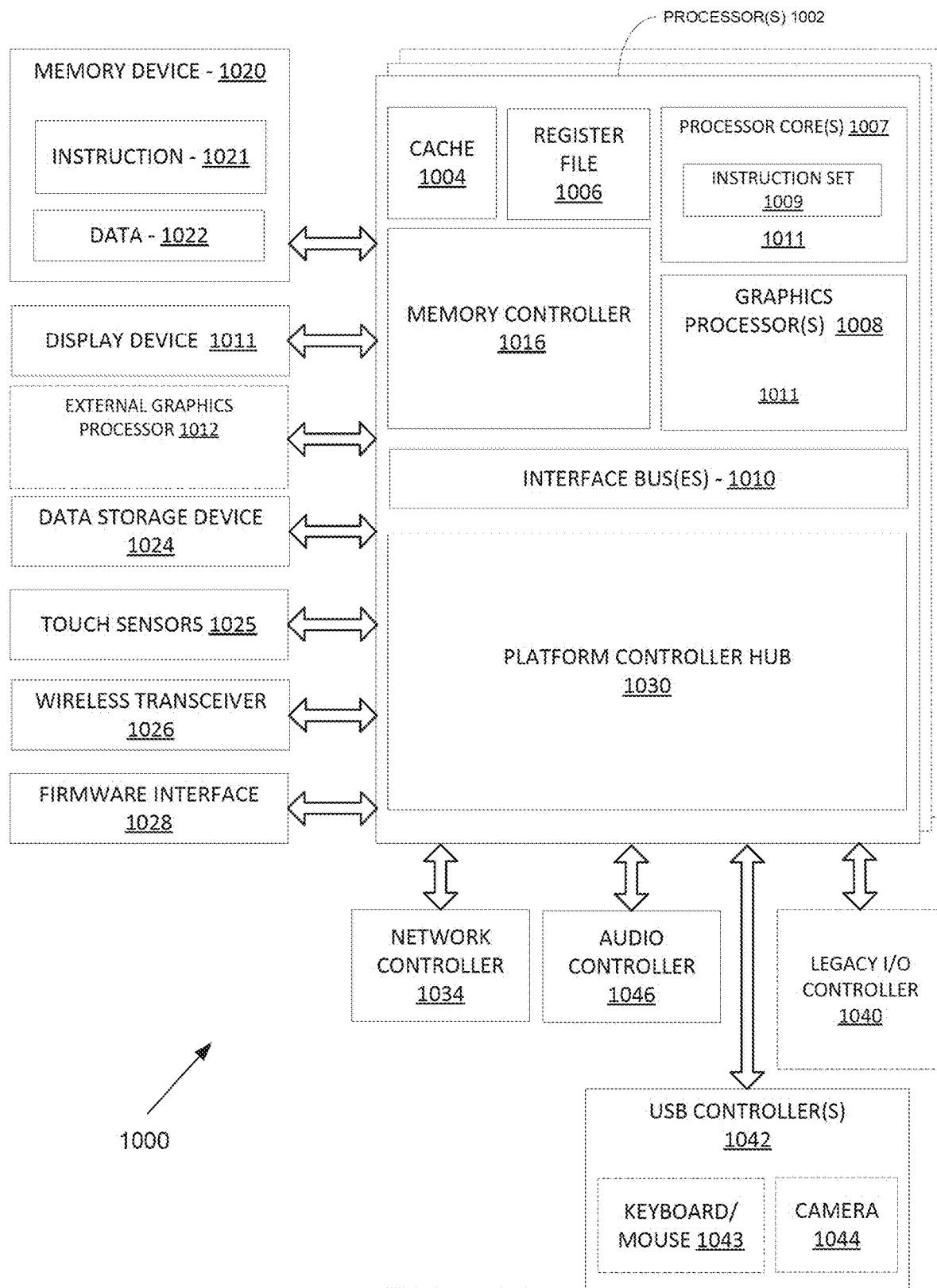
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system having a large number of processors 1002 or processor cores 1007. In at least one embodiment, system 1000 is a processing platform incorporated within a system-on-a-chip (SoC) integrated circuit for use in mobile, handheld, edge, or embedded devices.

In at least one embodiment, system 1000 may include, or be incorporated within a server-based gaming platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 may also include, couple with, or be integrated within a wearable device, such as a smart watch wearable device, smart eyewear device, augmented reality device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 may have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, may be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 may be a dynamic random access memory (DRAM) device, a static random access memory (SRAM) device, flash memory device, phase-change memory device, or some other memory device having suitable performance to serve as process memory. In at least one embodiment memory device 1020 may operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 may connect to processor(s) 1002. In at least one embodiment display device 1011 may include one or more of an internal display device, as in a mobile electronic device or a laptop device or an external display device attached via a display interface (e.g., DisplayPort, etc.). In at least one embodiment, display device 1011 may include a head mounted display (HMD) such as a stereoscopic display device for use in virtual reality (VR) applications or augmented reality (AR) applications.

In at least one embodiment, platform controller hub 1030 allows peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 may connect via a storage interface (e.g., SATA) or via a peripheral bus, such as a Peripheral Component Interconnect bus (e.g., PCI, PCI Express). In at least one embodiment, touch sensors 1025 may include touch screen sensors, pressure sensors, or fingerprint sensors. In at least one embodiment, wireless transceiver 1026 may be a Wi-Fi transceiver, a Bluetooth transceiver, or a mobile network transceiver such as a 3G, 4G, or Long Term Evolution (LTE) transceiver. In at least one embodiment, firmware interface 1028 allows communication with system firmware, and may be, for example, a unified extensible firmware interface (UEFI). In at least one embodiment, network controller 1034 may allow a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 may also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 may include an external memory controller 1016 and platform controller hub 1030, which may be configured as a memory controller hub and peripheral controller hub within a system chipset that is in communication with processor(s) 1002.

Inference and/or training logic 615 are used to perform inferencing and/or training operations associated with one or more embodiments. Details regarding inference and/or training logic 615 are provided below in conjunction with FIGS. 6A and/or 6B. In at least one embodiment portions or all of inference and/or training logic 615 may be incorporated into graphics processor 1100. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 6A or 6B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 11:
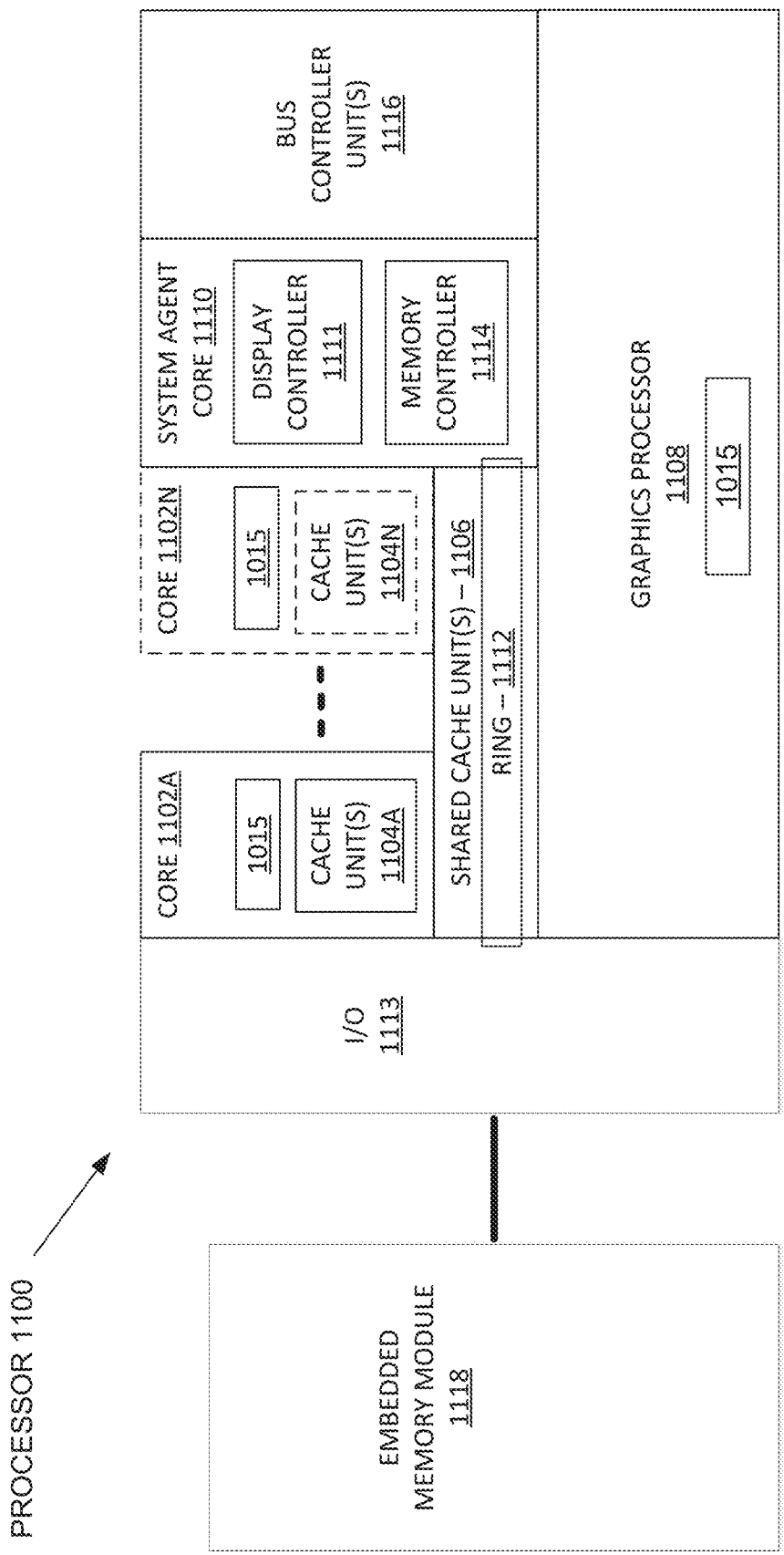
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 may include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 may be implemented on one or more chips or as an SoC integrated circuit.

Inference and/or training logic 615 are used to perform inferencing and/or training operations associated with one or more embodiments. Details regarding inference and/or training logic 615 are provided below in conjunction with FIGS. 6A and/or 6B. In at least one embodiment portions or all of inference and/or training logic 615 may be incorporated into processor 1100. For example, in at least one embodiment, training and/or inferencing techniques described herein may use one or more of ALUs embodied in graphics processor 1108, graphics core(s) 1102A-1102N, or other components in FIG. 11. Moreover, in at least one embodiment, inferencing and/or training operations described herein may be done using logic other than logic illustrated in FIG. 6A or 6B. In at least one embodiment, weight parameters may be stored in on-chip or off-chip memory and/or registers (shown or not shown) that configure ALUs of graphics processor 1100 to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Virtualized Computing Platform

Figure 12:
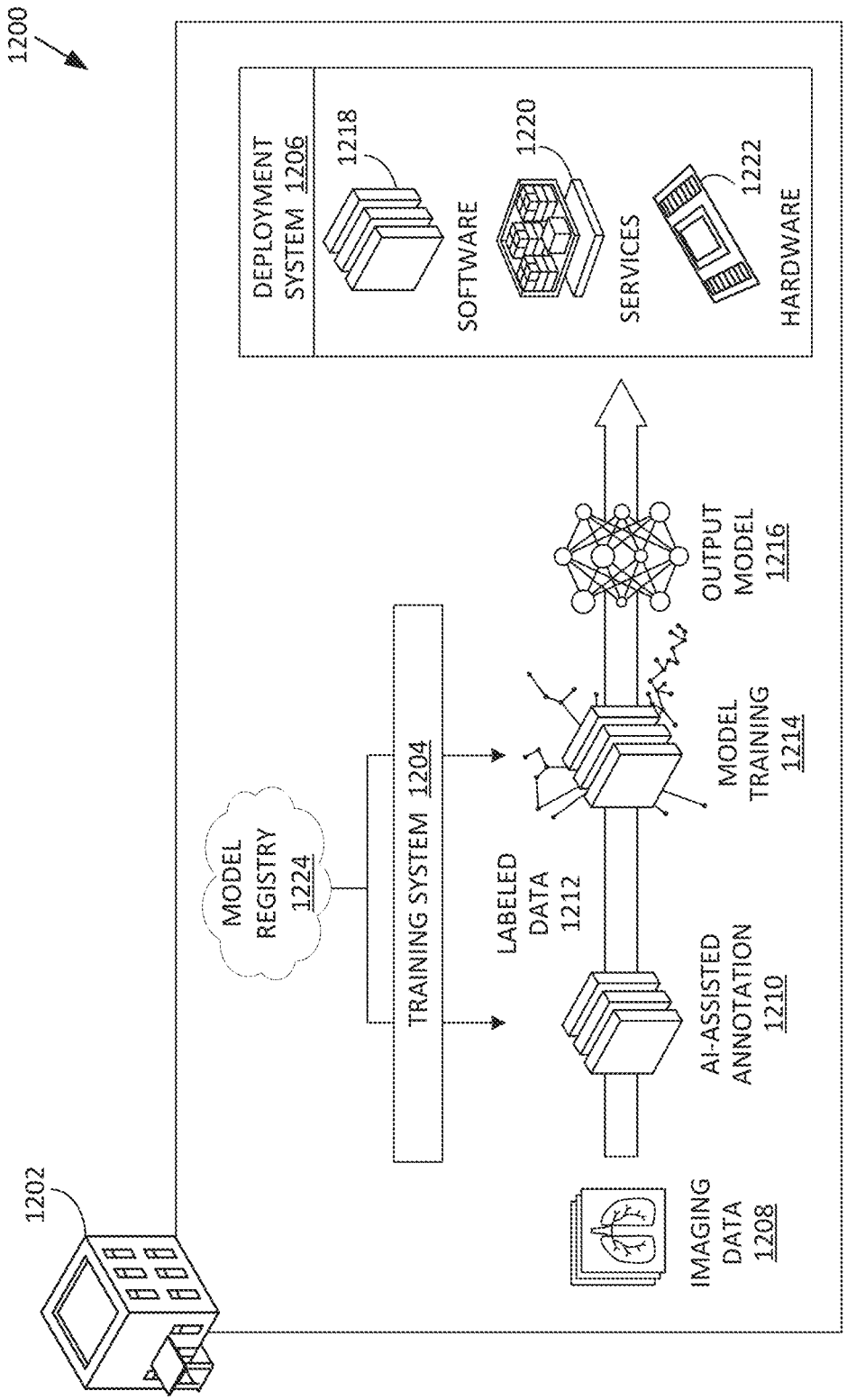
FIG. 12 is an example data flow diagram for an advanced computing pipeline, in accordance with at least one embodiment.

FIG. 12 is an example data flow diagram for a process 1200 of generating and deploying an image processing and inferencing pipeline, in accordance with at least one embodiment. In at least one embodiment, process 1200 may be deployed for use with imaging devices, processing devices, and/or other device types at one or more facilities 1202. Process 1200 may be executed within a training system 1204 and/or a deployment system 1206. In at least one embodiment, training system 1204 may be used to perform training, deployment, and implementation of machine learning models (e.g., neural networks, object detection algorithms, computer vision algorithms, etc.) for use in deployment system 1206. In at least one embodiment, deployment system 1206 may be configured to offload processing and compute resources among a distributed computing environment to reduce infrastructure requirements at facility 1202. In at least one embodiment, one or more applications in a pipeline may use or call upon services (e.g., inference, visualization, compute, AI, etc.) of deployment system 1206 during execution of applications.

In at least one embodiment, some of applications used in advanced processing and inferencing pipelines may use machine learning models or other AI to perform one or more processing steps. In at least one embodiment, machine learning models may be trained at facility 1202 using data 1208 (such as imaging data) generated at facility 1202 (and stored on one or more picture archiving and communication system (PACS) servers at facility 1202), may be trained using imaging or sequencing data 1208 from another facility (ies), or a combination thereof. In at least one embodiment, training system 1204 may be used to provide applications, services, and/or other resources for generating working, deployable machine learning models for deployment system 1206.

In at least one embodiment, model registry 1224 may be backed by object storage that may support versioning and object metadata. In at least one embodiment, object storage may be accessible through, for example, a cloud storage (e.g., cloud 1326 of FIG. 13) compatible application programming interface (API) from within a cloud platform. In at least one embodiment, machine learning models within model registry 1224 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1304 (FIG. 13) may include a scenario where facility 1202 is training their own machine learning model, or has an existing machine learning model that needs to be optimized or updated. In at least one embodiment, imaging data 1208 generated by imaging device(s), sequencing devices, and/or other device types may be received. In at least one embodiment, once imaging data 1208 is received, AI-assisted annotation 1210 may be used to aid in generating annotations corresponding to imaging data 1208 to be used as ground truth data for a machine learning model. In at least one embodiment, AI-assisted annotation 1210 may include one or more machine learning models (e.g., convolutional neural networks (CNNs)) that may be trained to generate annotations corresponding to certain types of imaging data 1208 (e.g., from certain devices). In at least one embodiment, AI-assisted annotations 1210 may then be used directly, or may be adjusted or fine-tuned using an annotation tool to generate ground truth data. In at least one embodiment, AI-assisted annotations 1210, labeled clinic data 1212, or a combination thereof may be used as ground truth data for training a machine learning model. In at least one embodiment, a trained machine learning model may be referred to as output model 1216, and may be used by deployment system 1206, as described herein.

In at least one embodiment, training pipeline 1304 (FIG. 13) may include a scenario where facility 1202 needs a machine learning model for use in performing one or more processing tasks for one or more applications in deployment system 1206, but facility 1202 may not currently have such a machine learning model (or may not have a model that is optimized, efficient, or effective for such purposes). In at least one embodiment, an existing machine learning model may be selected from a model registry 1224. In at least one embodiment, model registry 1224 may include machine learning models trained to perform a variety of different inference tasks on imaging data. In at least one embodiment, machine learning models in model registry 1224 may have been trained on imaging data from different facilities than facility 1202 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1224. In at least one embodiment, a machine learning model may then be retrained, or updated, at any number of other facilities, and a retrained or updated model may be made available in model registry 1224. In at least one embodiment, a machine learning model may then be selected from model registry 1224—and referred to as output model 1216—and may be used in deployment system 1206 to perform one or more processing tasks for one or more applications of a deployment system.

In at least one embodiment, training pipeline 1304 (FIG. 13), a scenario may include facility 1202 requiring a machine learning model for use in performing one or more processing tasks for one or more applications in deployment system 1206, but facility 1202 may not currently have such a machine learning model (or may not have a model that is optimized, efficient, or effective for such purposes). In at least one embodiment, a machine learning model selected from model registry 1224 may not be fine-tuned or optimized for imaging data 1208 generated at facility 1202 because of differences in populations, robustness of training data used to train a machine learning model, diversity in anomalies of training data, and/or other issues with training data. In at least one embodiment, AI-assisted annotation 1210 may be used to aid in generating annotations corresponding to imaging data 1208 to be used as ground truth data for retraining or updating a machine learning model. In at least one embodiment, labeled data 1212 may be used as ground truth data for training a machine learning model. In at least one embodiment, retraining or updating a machine learning model may be referred to as model training 1214. In at least one embodiment, model training 1214—e.g., AI-assisted annotations 1210, labeled clinic data 1212, or a combination thereof—may be used as ground truth data for retraining or updating a machine learning model. In at least one embodiment, a trained machine learning model may be referred to as output model 1216, and may be used by deployment system 1206, as described herein.

In at least one embodiment, deployment system 1206 may include software 1218, services 1220, hardware 1222, and/or other components, features, and functionality. In at least one embodiment, deployment system 1206 may include a software "stack," such that software 1218 may be built on top of services 1220 and may use services 1220 to perform some or all of processing tasks, and services 1220 and software 1218 may be built on top of hardware 1222 and use hardware 1222 to execute processing, storage, and/or other compute tasks of deployment system 1206. In at least one embodiment, software 1218 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1208, in addition to containers that receive and configure imaging data for use by each container and/or for use by facility 1202 after processing through a pipeline (e.g., to convert outputs back to a usable data type). In at least one embodiment, a combination of containers within software 1218 (e.g., that make up a pipeline) may be referred to as a virtual instrument (as described in more detail herein), and a virtual instrument may leverage services 1220 and hardware 1222 to execute some or all processing tasks of applications instantiated in containers.

In at least one embodiment, a data processing pipeline may receive input data (e.g., imaging data 1208) in a specific format in response to an inference request (e.g., a request from a user of deployment system 1206). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1216 of training system 1204.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1224 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1220 as a system (e.g., system 1300 of FIG. 13). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1300 (e.g., for accuracy), an application may be available in a container registry for selection and/or implementation by a user to perform one or more processing tasks with respect to data at a facility (e.g., a second facility) of a user.

Figure 13:
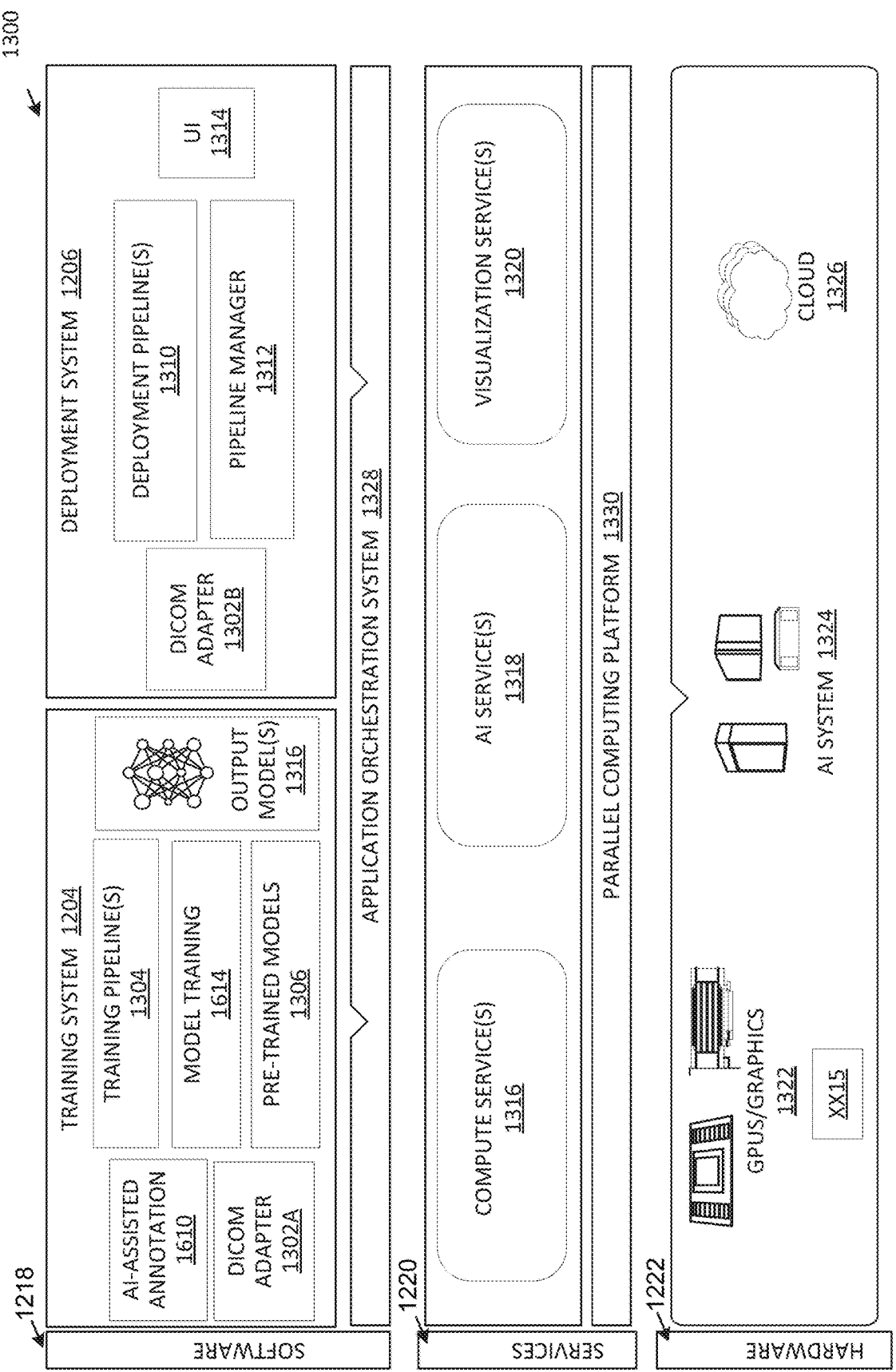
FIG. 13 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 1300 of FIG. 13). In at least one embodiment, completed and validated applications or containers may be stored in a container registry and associated machine learning models may be stored in model registry 1224. In at least one embodiment, a requesting entity—who provides an inference or image processing request—may browse a container registry and/or model registry 1224 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1206 (e.g., a cloud) to perform processing of data processing pipeline. In at least one embodiment, processing by deployment system 1206 may include referencing selected elements (e.g., applications, containers, models, etc.) from a container registry and/or model registry 1224. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1220 may be leveraged. In at least one embodiment, services 1220 may include compute services, artificial intelligence (AI) services, visualization services, and/or other service types. In at least one embodiment, services 1220 may provide functionality that is common to one or more applications in software 1218, so functionality may be abstracted to a service that may be called upon or leveraged by applications. In at least one embodiment, functionality provided by services 1220 may run dynamically and more efficiently, while also scaling well by allowing applications to process data in parallel (e.g., using a parallel computing platform 1330 (FIG. 13)). In at least one embodiment, rather than each application that shares a same functionality offered by a service 1220 being required to have a respective instance of service 1220, service 1220 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1220 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1218 implementing advanced processing and inferencing pipeline that includes segmentation application and anomaly detection application may be streamlined because each application may call upon a same inference service to perform one or more inferencing tasks.

In at least one embodiment, hardware 1222 may include GPUs, CPUs, DPUs, graphics cards, an AI/deep learning system (e.g., an AI supercomputer, such as NVIDIA's DGX), a cloud platform, or a combination thereof. In at least one embodiment, different types of hardware 1222 may be used to provide efficient, purpose-built support for software 1218 and services 1220 in deployment system 1206. In at least one embodiment, use of GPU processing may be implemented for processing locally (e.g., at facility 1202), within an AI/deep learning system, in a cloud system, and/or in other processing components of deployment system 1206 to improve efficiency, accuracy, and efficacy of image processing and generation. In at least one embodiment, software 1218 and/or services 1220 may be optimized for GPU processing with respect to deep learning, machine learning, and/or high-performance computing, as non-limiting examples. In at least one embodiment, at least some of computing environment of deployment system 1206 and/or training system 1204 may be executed in a datacenter one or more supercomputers or high performance computing systems, with GPU optimized software (e.g., hardware and software combination of NVIDIA's DGX System). In at least one embodiment, hardware 1222 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform may further include DPU processing to transmit data received over a network and/or through a network controller or other network interface directly to (e.g., a memory of) one or more GPU(s). In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to allow seamless scaling and load balancing.

FIG. 13 is a system diagram for an example system 1300 for generating and deploying an imaging deployment pipeline, in accordance with at least one embodiment. In at least one embodiment, system 1300 may be used to implement process 1200 of FIG. 12 and/or other processes including advanced processing and inferencing pipelines. In at least one embodiment, system 1300 may include training system 1204 and deployment system 1206. In at least one embodiment, training system 1204 and deployment system 1206 may be implemented using software 1218, services 1220, and/or hardware 1222, as described herein.

In at least one embodiment, system 1300 (e.g., training system 1204 and/or deployment system 1206) may implemented in a cloud computing environment (e.g., using cloud 1326). In at least one embodiment, system 1300 may be implemented locally with respect to a healthcare services facility, or as a combination of both cloud and local computing resources. In at least one embodiment, access to APIs in cloud 1326 may be restricted to authorized users through enacted security measures or protocols. In at least one embodiment, a security protocol may include web tokens that may be signed by an authentication (e.g., AuthN, AuthZ, Gluccon, etc.) service and may carry appropriate authorization. In at least one embodiment, APIs of virtual instruments (described herein), or other instantiations of system 1300, may be restricted to a set of public IPs that have been vetted or authorized for interaction.

In at least one embodiment, various components of system 1300 may communicate between and among one another using any of a variety of different network types, including but not limited to local area networks (LANs) and/or wide area networks (WANs) via wired and/or wireless communication protocols. In at least one embodiment, communication between facilities and components of system 1300 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1204 may execute training pipelines 1304, similar to those described herein with respect to FIG. 12. In at least one embodiment, where one or more machine learning models are to be used in deployment pipelines 1310 by deployment system 1206, training pipelines 1304 may be used to train or retrain one or more (e.g. pre-trained) models, and/or implement one or more of pre-trained models 1306 (e.g., without a need for retraining or updating). In at least one embodiment, as a result of training pipelines 1304, output model(s) 1216 may be generated. In at least one embodiment, training pipelines 1304 may include any number of processing steps, such as but not limited to imaging data (or other input data) conversion or adaption In at least one embodiment, for different machine learning models used by deployment system 1206, different training pipelines 1304 may be used. In at least one embodiment, training pipeline 1304 similar to a first example described with respect to FIG. 12 may be used for a first machine learning model, training pipeline 1304 similar to a second example described with respect to FIG. 12 may be used for a second machine learning model, and training pipeline 1304 similar to a third example described with respect to FIG. 12 may be used for a third machine learning model. In at least one embodiment, any combination of tasks within training system 1204 may be used depending on what is required for each respective machine learning model. In at least one embodiment, one or more of machine learning models may already be trained and ready for deployment so machine learning models may not undergo any processing by training system 1204, and may be implemented by deployment system 1206.

In at least one embodiment, output model(s) 1216 and/or pre-trained model(s) 1306 may include any types of machine learning models depending on implementation or embodiment. In at least one embodiment, and without limitation, machine learning models used by system 1300 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 14A:
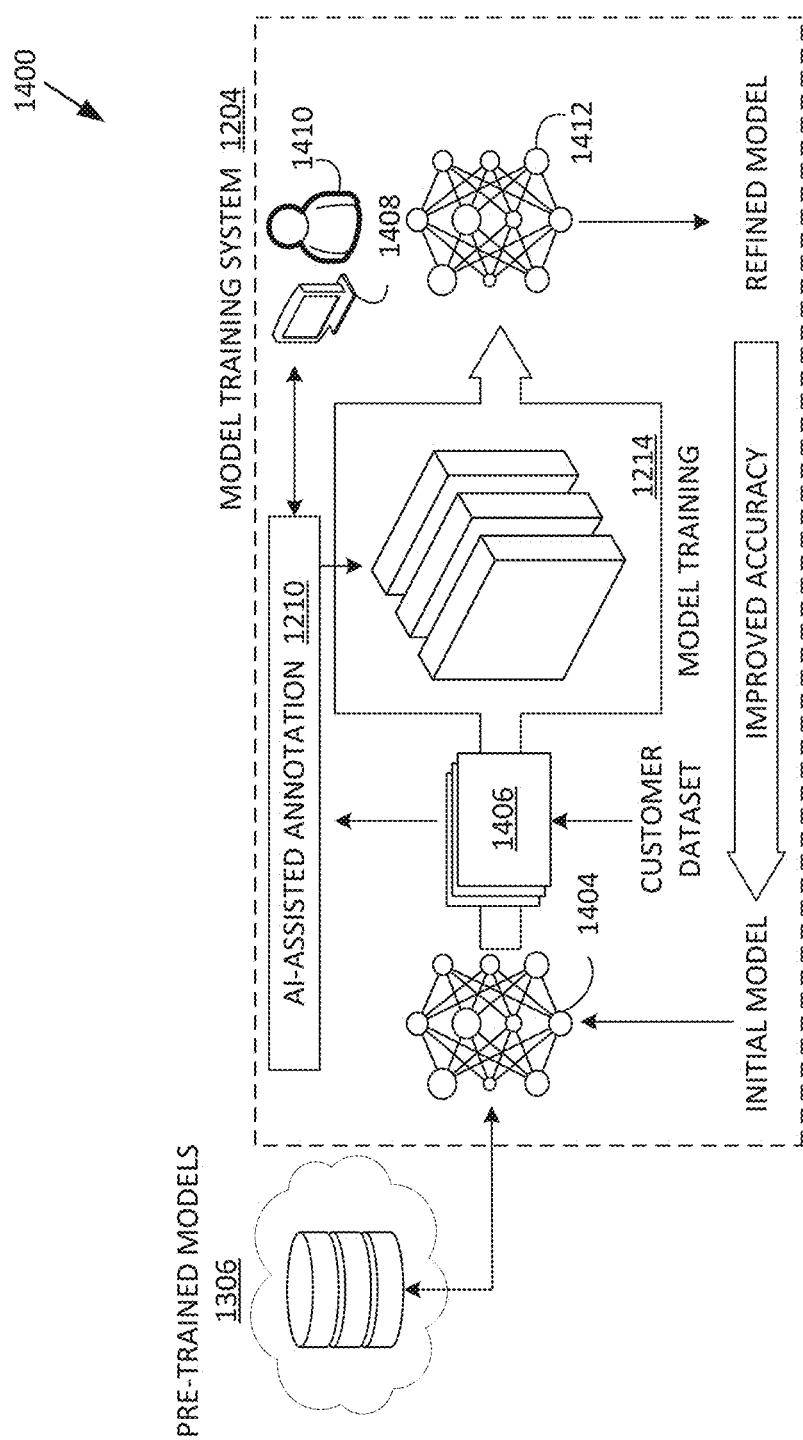
FIGS. 14A and 14B illustrate a data flow diagram for a process to train a machine learning model, as well as client-server architecture to enhance annotation tools with pre-trained annotation models, in accordance with at least one embodiment.
Figure 14B:
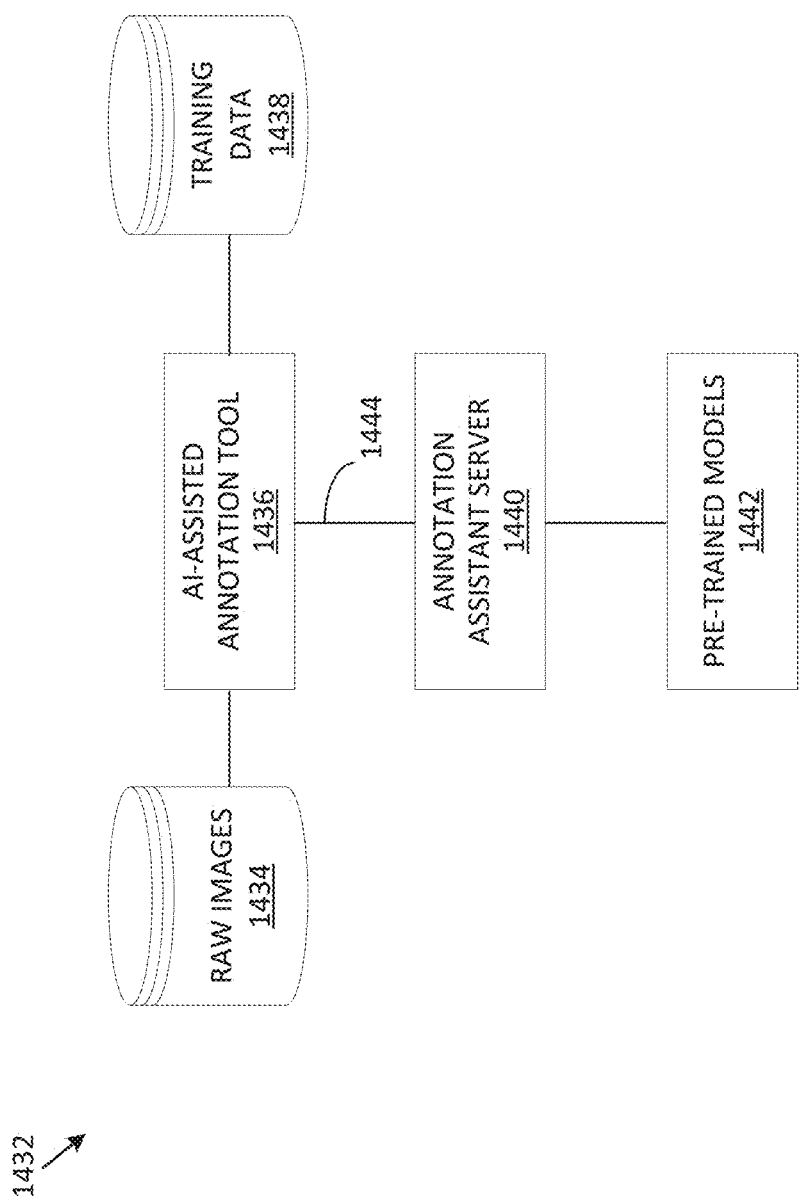

In at least one embodiment, training pipelines 1304 may include AI-assisted annotation, as described in more detail herein with respect to at least FIG. 14B. In at least one embodiment, labeled data 1212 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1208 (or other data type used by machine learning models), there may be corresponding ground truth data generated by training system 1204. In at least one embodiment, AI-assisted annotation may be performed as part of deployment pipelines 1310; either in addition to, or in lieu of AI-assisted annotation included in training pipelines 1304. In at least one embodiment, system 1300 may include a multi-layer platform that may include a software layer (e.g., software 1218) of diagnostic applications (or other application types) that may perform one or more medical imaging and diagnostic functions. In at least one embodiment, system 1300 may be communicatively coupled to (e.g., via encrypted links) PACS server networks of one or more facilities. In at least one embodiment, system 1300 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1202). In at least one embodiment, applications may then call or execute one or more services 1220 for performing compute, AI, or visualization tasks associated with respective applications, and software 1218 and/or services 1220 may leverage hardware 1222 to perform processing tasks in an effective and efficient manner.

In at least one embodiment, deployment system 1206 may execute deployment pipelines 1310. In at least one embodiment, deployment pipelines 1310 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1310 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1310 depending on information desired from data generated by a device. In at least one embodiment, where detections of anomalies are desired from an MRI machine, there may be a first deployment pipeline 1310, and where image enhancement is desired from output of an MRI machine, there may be a second deployment pipeline 1310.

In at least one embodiment, an image generation application may include a processing task that includes use of a machine learning model. In at least one embodiment, a user may desire to use their own machine learning model, or to select a machine learning model from model registry 1224. In at least one embodiment, a user may implement their own machine learning model or select a machine learning model for inclusion in an application for performing a processing task. In at least one embodiment, applications may be selectable and customizable, and by defining constructs of applications, deployment, and implementation of applications for a particular user are presented as a more seamless user experience. In at least one embodiment, by leveraging other features of system 1300—such as services 1220 and hardware 1222—deployment pipelines 1310 may be even more user friendly, provide for easier integration, and produce more accurate, efficient, and timely results.

In at least one embodiment, deployment system 1206 may include a user interface 1314 (e.g., a graphical user interface, a web interface, etc.) that may be used to select applications for inclusion in deployment pipeline(s) 1310, arrange applications, modify, or change applications or parameters or constructs thereof, use and interact with deployment pipeline(s) 1310 during set-up and/or deployment, and/or to otherwise interact with deployment system 1206. In at least one embodiment, although not illustrated with respect to training system 1204, user interface 1314 (or a different user interface) may be used for selecting models for use in deployment system 1206, for selecting models for training, or retraining, in training system 1204, and/or for otherwise interacting with training system 1204.

In at least one embodiment, pipeline manager 1312 may be used, in addition to an application orchestration system 1328, to manage interaction between applications or containers of deployment pipeline(s) 1310 and services 1220 and/or hardware 1222. In at least one embodiment, pipeline manager 1312 may be configured to facilitate interactions from application to application, from application to service 1220, and/or from application or service to hardware 1222. In at least one embodiment, although illustrated as included in software 1218, this is not intended to be limiting, and in some examples (e.g., as illustrated in FIG. 11) pipeline manager 1312 may be included in services 1220. In at least one embodiment, application orchestration system 1328 (e.g., Kubernetes, DOCKER, etc.) may include a container orchestration system that may group applications into containers as logical units for coordination, management, scaling, and deployment. In at least one embodiment, by associating applications from deployment pipeline(s) 1310 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1312 and application orchestration system 1328. In at least one embodiment, so long as an expected input and/or output of each container or application is known by a system (e.g., based on constructs of applications or containers), application orchestration system 1328 and/or pipeline manager 1312 may facilitate communication among and between, and sharing of resources among and between, each of applications or containers. In at least one embodiment, because one or more of applications or containers in deployment pipeline(s) 1310 may share same services and resources, application orchestration system 1328 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1328) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1220 leveraged by and shared by applications or containers in deployment system 1206 may include compute services 1316, AI services 1318, visualization services 1320, and/or other service types. In at least one embodiment, applications may call (e.g., execute) one or more of services 1220 to perform processing operations for an application. In at least one embodiment, compute services 1316 may be leveraged by applications to perform super-computing or other high-performance computing (HPC) tasks. In at least one embodiment, compute service(s) 1316 may be leveraged to perform parallel processing (e.g., using a parallel computing platform 1330) for processing data through one or more of applications and/or one or more tasks of a single application, substantially simultaneously. In at least one embodiment, parallel computing platform 1330 (e.g., NVIDIA's CUDA) may allow general purpose computing on GPUs (GPGPU) (e.g., GPUs 1322). In at least one embodiment, a software layer of parallel computing platform 1330 may provide access to virtual instruction sets and parallel computational elements of GPUs, for execution of compute kernels. In at least one embodiment, parallel computing platform 1330 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1330 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1318 may be leveraged to perform inferencing services for executing machine learning model(s) associated with applications (e.g., tasked with performing one or more processing tasks of an application). In at least one embodiment, AI services 1318 may leverage AI system 1324 to execute machine learning model(s) (e.g., neural networks, such as CNNs) for segmentation, reconstruction, object detection, feature detection, classification, and/or other inferencing tasks. In at least one embodiment, applications of deployment pipeline(s) 1310 may use one or more of output models 1216 from training system 1204 and/or other models of applications to perform inference on imaging data. In at least one embodiment, two or more examples of inferencing using application orchestration system 1328 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1328 may distribute resources (e.g., services 1220 and/or hardware 1222) based on priority paths for different inferencing tasks of AI services 1318.

In at least one embodiment, shared storage may be mounted to AI services 1318 within system 1300. In at least one embodiment, shared storage may operate as a cache (or other storage device type) and may be used to process inference requests from applications. In at least one embodiment, when an inference request is submitted, a request may be received by a set of API instances of deployment system 1206, and one or more instances may be selected (e.g., for best fit, for load balancing, etc.) to process a request. In at least one embodiment, to process a request, a request may be entered into a database, a machine learning model may be located from model registry 1224 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1312) may be used to launch an application that is referenced in a request if an application is not already running or if there are not enough instances of an application. In at least one embodiment, if an inference server is not already launched to execute a model, an inference server may be launched.

Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s) and/or DPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<12 min). In at least one embodiment, model execution times may be measured from requesting institution or entity and may include partner network traversal time, as well as execution on an inference service.

In at least one embodiment, transfer of requests between services 1220 and inference applications may be hidden behind a software development kit (SDK), and robust transport may be provided through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1326, and an inference service may perform inferencing on a GPU.

In at least one embodiment, visualization services 1320 may be leveraged to generate visualizations for viewing outputs of applications and/or deployment pipeline(s) 1310. In at least one embodiment, GPUs 1322 may be leveraged by visualization services 1320 to generate visualizations. In at least one embodiment, rendering effects, such as ray-tracing, may be implemented by visualization services 1320 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1320 may include an internal visualizer, cinematics, and/or other rendering or image processing capabilities or functionality (e.g., ray tracing, rasterization, internal optics, etc.).

In at least one embodiment, hardware 1222 may include GPUs 1322, AI system 1324, cloud 1326, and/or any other hardware used for executing training system 1204 and/or deployment system 1206. In at least one embodiment, GPUs 1322 (e.g., NVIDIA's TESLA and/or QUADRO GPUs) may include any number of GPUs that may be used for executing processing tasks of compute services 1316, AI services 1318, visualization services 1320, other services, and/or any of features or functionality of software 1218. For example, with respect to AI services 1318, GPUs 1322 may be used to perform pre-processing on imaging data (or other data types used by machine learning models), post-processing on outputs of machine learning models, and/or to perform inferencing (e.g., to execute machine learning models). In at least one embodiment, cloud 1326, AI system 1324, and/or other components of system 1300 may use GPUs 1322. In at least one embodiment, cloud 1326 may include a GPU-optimized platform for deep learning tasks. In at least one embodiment, AI system 1324 may use GPUs, and cloud 1326—or at least a portion tasked with deep learning or inferencing—may be executed using one or more AI systems 1324. As such, although hardware 1222 is illustrated as discrete components, this is not intended to be limiting, and any components of hardware 1222 may be combined with, or leveraged by, any other components of hardware 1222.

In at least one embodiment, AI system 1324 may include a purpose-built computing system (e.g., a super-computer or an HPC) configured for inferencing, deep learning, machine learning, and/or other artificial intelligence tasks. In at least one embodiment, AI system 1324 (e.g., NVIDIA's DGX) may include GPU-optimized software (e.g., a software stack) that may be executed using a plurality of GPUs 1322, in addition to DPUs, CPUs, RAM, storage, and/or other components, features, or functionality. In at least one embodiment, one or more AI systems 1324 may be implemented in cloud 1326 (e.g., in a data center) for performing some or all of AI-based processing tasks of system 1300.

In at least one embodiment, cloud 1326 may include a GPU-accelerated infrastructure (e.g., NVIDIA's NGC) that may provide a GPU-optimized platform for executing processing tasks of system 1300. In at least one embodiment, cloud 1326 may include an AI system(s) 1324 for performing one or more of AI-based tasks of system 1300 (e.g., as a hardware abstraction and scaling platform). In at least one embodiment, cloud 1326 may integrate with application orchestration system 1328 leveraging multiple GPUs to allow seamless scaling and load balancing between and among applications and services 1220. In at least one embodiment, cloud 1326 may tasked with executing at least some of services 1220 of system 1300, including compute services 1316, AI services 1318, and/or visualization services 1320, as described herein. In at least one embodiment, cloud 1326 may perform small and large batch inference (e.g., executing NVIDIA's TENSOR RT), provide an accelerated parallel computing API and platform 1330 (e.g., NVIDIA's CUDA), execute application orchestration system 1328 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1300.

FIG. 14A illustrates a data flow diagram for a process 1400 to train, retrain, or update a machine learning model, in accordance with at least one embodiment. In at least one embodiment, process 1400 may be executed using, as a non-limiting example, system 1300 of FIG. 13. In at least one embodiment, process 1400 may leverage services 1220 and/or hardware 1222 of system 1300, as described herein. In at least one embodiment, refined models 1412 generated by process 1400 may be executed by deployment system 1206 for one or more containerized applications in deployment pipelines 1310.

In at least one embodiment, model training 1214 may include retraining or updating an initial model 1404 (e.g., a pre-trained model) using new training data (e.g., new input data, such as customer dataset 1406, and/or new ground truth data associated with input data). In at least one embodiment, to retrain, or update, initial model 1404, output or loss layer(s) of initial model 1404 may be reset, or deleted, and/or replaced with an updated or new output or loss layer(s). In at least one embodiment, initial model 1404 may have previously fine-tuned parameters (e.g., weights and/or biases) that remain from prior training, so training or retraining 1214 may not take as long or require as much processing as training a model from scratch. In at least one embodiment, during model training 1214, by having reset or replaced output or loss layer(s) of initial model 1404, parameters may be updated and re-tuned for a new data set based on loss calculations associated with accuracy of output or loss layer(s) at generating predictions on new, customer dataset 1406 (e.g., image data 1208 of FIG. 12).

In at least one embodiment, pre-trained models 1306 may be stored in a data store, or registry (e.g., model registry 1224 of FIG. 12). In at least one embodiment, pre-trained models 1306 may have been trained, at least in part, at one or more facilities other than a facility executing process 1400. In at least one embodiment, to protect privacy and rights of patients, subjects, or clients of different facilities, pre-trained models 1306 may have been trained, on-premise, using customer or patient data generated on-premise. In at least one embodiment, pre-trained models 1306 may be trained using cloud 1326 and/or other hardware 1222, but confidential, privacy protected patient data may not be transferred to, used by, or accessible to any components of cloud 1326 (or other off premise hardware). In at least one embodiment, where a pre-trained model 1306 is trained at using patient data from more than one facility, pre-trained model 1306 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1306 on-premise and/or off premise, such as in a datacenter or other cloud computing infrastructure.

In at least one embodiment, when selecting applications for use in deployment pipelines 1310, a user may also select machine learning models to be used for specific applications. In at least one embodiment, a user may not have a model for use, so a user may select a pre-trained model 1306 to use with an application. In at least one embodiment, pre-trained model 1306 may not be optimized for generating accurate results on customer dataset 1406 of a facility of a user (e.g., based on patient diversity, demographics, types of medical imaging devices used, etc.). In at least one embodiment, prior to deploying pre-trained model 1306 into deployment pipeline 1310 for use with an application(s), pre-trained model 1306 may be updated, retrained, and/or fine-tuned for use at a respective facility.

In at least one embodiment, a user may select pre-trained model 1306 that is to be updated, retrained, and/or fine-tuned, and pre-trained model 1306 may be referred to as initial model 1404 for training system 1204 within process 1400. In at least one embodiment, customer dataset 1406 (e.g., imaging data, genomics data, sequencing data, or other data types generated by devices at a facility) may be used to perform model training 1214 (which may include, without limitation, transfer learning) on initial model 1404 to generate refined model 1412. In at least one embodiment, ground truth data corresponding to customer dataset 1406 may be generated by training system 1204. In at least one embodiment, ground truth data may be generated, at least in part, by clinicians, scientists, doctors, practitioners, at a facility (e.g., as labeled clinic data 1212 of FIG. 12).

In at least one embodiment, AI-assisted annotation 1210 may be used in some examples to generate ground truth data. In at least one embodiment, AI-assisted annotation 1210 (e.g., implemented using an AI-assisted annotation SDK) may leverage machine learning models (e.g., neural networks) to generate suggested or predicted ground truth data for a customer dataset. In at least one embodiment, user 1410 may use annotation tools within a user interface (a graphical user interface (GUI)) on computing device 1408.

In at least one embodiment, user 1410 may interact with a GUI via computing device 1408 to edit or fine-tune (auto)annotations. In at least one embodiment, a polygon editing feature may be used to move vertices of a polygon to more accurate or fine-tuned locations.

In at least one embodiment, once customer dataset 1406 has associated ground truth data, ground truth data (e.g., from AI-assisted annotation, manual labeling, etc.) may be used by during model training 1214 to generate refined model 1412. In at least one embodiment, customer dataset 1406 may be applied to initial model 1404 any number of times, and ground truth data may be used to update parameters of initial model 1404 until an acceptable level of accuracy is attained for refined model 1412. In at least one embodiment, once refined model 1412 is generated, refined model 1412 may be deployed within one or more deployment pipelines 1310 at a facility for performing one or more processing tasks with respect to medical imaging data.

In at least one embodiment, refined model 1412 may be uploaded to pre-trained models 1306 in model registry 1224 to be selected by another facility. In at least one embodiment, his process may be completed at any number of facilities such that refined model 1412 may be further refined on new datasets any number of times to generate a more universal model.

FIG. 14B is an example illustration of a client-server architecture 1432 to enhance annotation tools with pre-trained annotation models, in accordance with at least one embodiment. In at least one embodiment, AI-assisted annotation tools 1436 may be instantiated based on a client-server architecture 1432. In at least one embodiment, annotation tools 1436 in imaging applications may aid radiologists, for example, identify organs and abnormalities. In at least one embodiment, imaging applications may include software tools that help user 1410 to identify, as a non-limiting example, a few extreme points on a particular organ of interest in raw images 1434 (e.g., in a 3D MRI or CT scan) and receive auto-annotated results for all 2D slices of a particular organ. In at least one embodiment, results may be stored in a data store as training data 1438 and used as (for example and without limitation) ground truth data for training. In at least one embodiment, when computing device 1408 sends extreme points for AI-assisted annotation 1210, a deep learning model, for example, may receive this data as input and return inference results of a segmented organ or abnormality. In at least one embodiment, pre-instantiated annotation tools, such as AI-Assisted Annotation Tool 1436B in FIG. 14B, may be enhanced by making API calls (e.g., API Call 1444) to a server, such as an Annotation Assistant Server 1440 that may include a set of pre-trained models 1442 stored in an annotation model registry, for example. In at least one embodiment, an annotation model registry may store pre-trained models 1442 (e.g., machine learning models, such as deep learning models) that are pre-trained to perform AI-assisted annotation on a particular organ or abnormality. These models may be further updated by using training pipelines 1304. In at least one embodiment, pre-installed annotation tools may be improved over time as new labeled clinic data 1212 is added.

Such components may be used to generate synthetic data imitating failure cases in a network training process, which may help to improve performance of the network while limiting the amount of synthetic data to avoid overfitting.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but may be more when so indicated either explicitly or by context. Further, unless stated otherwise or otherwise clear from context, phrase "based on" means "based at least in part on" and not "based solely on."

Operations of processes described herein may be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that allow performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data may be accomplished in a variety of ways such as by receiving data as a parameter of a function call or a call to an application programming interface. In some implementations, process of obtaining, acquiring, receiving, or inputting analog or digital data may be accomplished by transferring data via a serial or parallel interface. In another implementation, process of obtaining, acquiring, receiving, or inputting analog or digital data may be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data may be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method of managing a cache located on a processor, the method comprising:
    identifying a plurality of memory addresses associated with a workload of an application executing using the processor;
    determining a characteristic of the workload that corresponds to an amount of traffic between the cache and off-chip memory generated at one or more memory addresses of the plurality of memory addresses;
    determining an amount of reuse of the plurality of memory addresses using the characteristic;
    determining a cache management policy for the workload based on the amount of reuse; and
    applying the cache management policy to the cache.

2. The method of claim 1, wherein the application is a neural network (NN) inference application, and the plurality of memory addresses are a plurality of virtual addresses.

3. The method of claim 2, wherein one or more virtual addresses of the plurality of virtual addresses are associated with activation data of the workload of the NN inference application.

4. The method of claim 3, wherein the determining the amount of reuse includes computing the amount of reuse according to a quantitative metric, the quantitative metric comprising a number of layers associated with the NN inference application that access the one or more virtual addresses associated with the activation data of the workload.

5. The method of claim 4, wherein applying the cache management policy to the cache comprises applying one or more eviction priority controls to one or more memory addresses of the plurality of memory addresses based on the quantitative metric.

6. The method of claim 5, wherein applying the one or more eviction priority controls to the one or more memory addresses of the plurality of memory addresses comprises designating at least one of an evict-last eviction priority control, an evict-normal eviction priority control, or an evict-first eviction priority control for at least one memory address of the one or more memory addresses.

7. The method of claim 2, wherein one or more virtual addresses of the plurality of virtual addresses are associated with weight data of the workload of the NN inference application.

8. A system comprising:
a processor, having a cache located thereon, to perform operations comprising:
identifying a plurality of memory addresses associated with a workload of an application executing using the processor;
determining a characteristic of the workload that corresponds to an amount of traffic between the cache and off-chip memory generated at one or more memory addresses of the plurality of memory addresses;
determining an amount of reuse of the memory addresses using the characteristic;
determining a cache management policy for the workload based on the amount of reuse; and
applying the cache management policy to the cache.

9. The system of claim 8, wherein the application is a neural network (NN) inference application, and the plurality of memory addresses are a plurality of virtual addresses.

10. The system of claim 9, wherein one or more virtual addresses of the plurality of virtual addresses are associated with activation data of the workload of the NN inference application.

11. The system of claim 10, wherein the determining the amount of reuse includes computing the amount of reuse according to a quantitative metric, the quantitative metric comprising a number of layers associated with the NN inference application that access the one or more virtual addresses associated with the activation data of the workload.

12. The system of claim 11, wherein applying the cache management policy for the workload based on the quantitative metric comprises applying one or more eviction priority controls to one or more memory addresses of the plurality of memory addresses based on the quantitative metric.

13. The system of claim 12, wherein applying the eviction priority controls to the one or more memory addresses of the plurality of memory addresses comprises designating at least one of an evict-last eviction priority control, an evict-normal eviction priority control, or an evict first eviction priority control for at least one memory address of the one or more memory addresses.

14. The system of claim 9, wherein one or more virtual addresses of the plurality of virtual addresses are associated with weight data of the workload of the NN inference application.

15. A processor comprising:
one or more processing units to:
identify a plurality of memory addresses associated with a workload of an application;
determine a characteristic of the workload that corresponds to an amount of traffic between a cache corresponding to the processor and off-chip memory generated at one or more memory addresses of the plurality of memory addresses;
determine an amount of reuse of the plurality of memory addresses using the characteristic;
determine a cache management policy to apply to the cache for the workload based at least on the amount of reuse; and
apply the cache management policy to the cache.

16. The processor of claim 15, wherein the application is a neural network (NN) inference application, and the plurality of memory addresses are a plurality of virtual addresses.

17. The processor of claim 16, wherein one or more virtual addresses of the plurality of virtual addresses are associated with activation data of the workload of the NN inference application.

18. The processor of claim 17, wherein the one or more processing units are to determine the amount of reuse according to a quantitative metric, the quantitative metric comprising a number of layers associated with the NN inference application that access the one or more virtual addresses associated with the activation data of the workload.

19. The processor of claim 15, wherein the one or more processing units are to apply the cache management policy to the cache by applying one or more eviction priority controls to at least one memory address of the one or more memory addresses of the plurality of memory addresses based on the amount of reuse of the plurality of memory addresses corresponding to the workload.

20. The processor of claim 19, wherein the applying the one or more eviction priority controls to the at least one memory address of the one or more memory addresses comprises designating at least one of an evict-last eviction priority control, an evict-normal eviction priority control, or an evict-first eviction priority control for at least one memory address of the one or more memory addresses.

* * * * *